United States Patent
Singh et al.

(10) Patent No.: US 11,132,331 B2
(45) Date of Patent: *Sep. 28, 2021

(54) SHARDING OF FULL AND INCREMENTAL SNAPSHOTS

(71) Applicant: RUBRIK, INC., Palo Alto, CA (US)

(72) Inventors: Janmejay Singh, Bangalore (IN);
Anmol Arora, Indore MP (IN);
Fabiano Botelho, San Ramon, CA (US); Jonathan Derryberry, San Jose, CA (US); Mudit Malpani, Mountain View, CA (US); Satwant Rana, New Delhi (IN)

(73) Assignee: Rubrik, Inc., Palo Alto, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/838,900

(22) Filed: Dec. 12, 2017

(65) Prior Publication Data

US 2019/0179918 A1    Jun. 13, 2019

(51) Int. Cl.
*G06F 16/11* (2019.01)
*G06F 9/455* (2018.01)
(Continued)

(52) U.S. Cl.
CPC ........ *G06F 16/128* (2019.01); *G06F 9/45558* (2013.01); *G06F 11/1461* (2013.01);
(Continued)

(58) Field of Classification Search
CPC .............. G06F 16/128; G06F 9/45558; G06F 11/1461; G06F 11/3034; G06F 2009/45575; G06F 2201/84
See application file for complete search history.

(56) References Cited

U.S. PATENT DOCUMENTS 9,189,342 B1 * 11/2015 von Thenen ........ G06F 9/45558
9,292,327 B1 * 3/2016 von Thenen ........ G06F 9/45558
(Continued)

FOREIGN PATENT DOCUMENTS

WO    2019112955    6/2019

OTHER PUBLICATIONS

On-Demand Snapshot Maintenance in Data Warehouses Using Incremental ETL Pipeline by Qu (Year: 2017).*
(Continued)

*Primary Examiner* — Paul M Knight
(74) *Attorney, Agent, or Firm* — Schwegman Lundberg & Woessner, P.A.

(57) ABSTRACT

Methods and systems for backing up and restoring different point in time versions of a virtual machine, an application, a database, or an electronic file using independently managed snapshot chains are described. In some cases, different point in time versions of a virtual machine may be captured and stored using one or more snapshot chains. Each snapshot chain may correspond with a base image (e.g., a full image snapshot) and one or more incremental files (e.g., two forward incremental files) that derive from the base image. A snapshot chain may be split into a plurality of shards or sub-chains such that the width of each shard or the maximum data size of the files in each shard is less than a threshold data size (e.g., is less than 1 TB). Data operations (e.g., consolidation and reverse operations) may be performed on the individual shards or sub-chains in parallel.

16 Claims, 23 Drawing Sheets

(51) Int. Cl.
*G06F 11/30* (2006.01)
*G06F 11/14* (2006.01)
(52) U.S. Cl.
CPC .............. *G06F 11/3034* (2013.01); *G06F 2009/45575* (2013.01); *G06F 2201/84* (2013.01)

(56) References Cited

U.S. PATENT DOCUMENTS

| | | | | |
|---|---|---|---|---|
| 10,514,989 | B1* | 12/2019 | Borodin | G06F 11/1464 |
| 2008/0104139 | A1* | 5/2008 | Xu | G06F 3/065 |
| 2009/0292737 | A1* | 11/2009 | Hayton | G06F 8/63 |
| 2011/0196833 | A1* | 8/2011 | Drobychev | G06F 16/23 |
| | | | | 707/634 |
| 2012/0324183 | A1 | 12/2012 | Chiruvolu | |
| 2013/0110783 | A1* | 5/2013 | Wertheimer | G06F 11/14 |
| | | | | 707/646 |
| 2014/0059311 | A1* | 2/2014 | Oberhofer | G06F 3/065 |
| | | | | 711/162 |
| 2015/0161151 | A1* | 6/2015 | Koryakina | G06F 16/128 |
| | | | | 711/114 |
| 2015/0254141 | A1* | 9/2015 | Wertheimer | G06F 16/22 |
| | | | | 707/646 |
| 2015/0378636 | A1* | 12/2015 | Yadav | G06F 3/0652 |
| | | | | 711/165 |
| 2016/0124665 | A1 | 5/2016 | Jain | |
| 2017/0004048 | A1* | 1/2017 | Adkins | G06F 11/1448 |
| 2017/0031771 | A1* | 2/2017 | Binford | G06F 11/1448 |
| 2017/0262465 | A1 | 9/2017 | Goggin | |
| 2018/0020013 | A1* | 1/2018 | Yoshikawa | G06F 21/554 |

OTHER PUBLICATIONS

PCT International Search Report dated Apr. 16, 2019, PCT Patent Application No. PCT/US2018/068625.
PCT Written Opinion of the International Searching Authority dated Apr. 16, 2019, PCT Patent Application No. PCT/US2018/068625.
Office Action dated Aug. 21, 2019, U.S. Appl. No. 15/835,429.

* cited by examiner

```
Virtual Machine A, Version V7 {
    pBase,          ⟶  /snapshots/VM_A/s5/s5.full
    pF1,            ⟶  /snapshots/VM_A/s6/s6.delta
    pF2             ⟶  /snapshots/VM_A/s7/s7.delta
}
```

```
Virtual Machine A, Version V2 {
    pBase,          ⟶  /snapshots/VM_A/s5/s5.full
    pR1,            ⟶  /snapshots/VM_A/s4/s4.delta
    pR2,            ⟶  /snapshots/VM_A/s3/s3.delta
    pR3             ⟶  /snapshots/VM_A/s2/s2.delta
}
```

Versions of Virtual Machine A                Stored Files

Version V1 / Time T1       R4    ▯
Version V2 / Time T2       R3    ▯
Version V3 / Time T3       R2    ▯        } Reverse incrementals
Version V4 / Time T4       R1    ▯
Version V5 / Time T5       R12   ▯
Version V6 / Time T6       R11   ▯

Version V7 / Time T7       Base2 ▭        } Full image

FIG. 2D

Virtual Machine A, Version V7 {
    pBase2,          ⟶   /snapshots/VM_A/s7/s7.full
}

FIG. 2E

Virtual Machine A, Version V2 {
    pBase2,          ⟶   /snapshots/VM_A/s7/s7.full
    pR11,            ⟶   /snapshots/VM_A/s6/s6.delta
    pR12,            ⟶   /snapshots/VM_A/s5/s5.delta
    pR1,             ⟶   /snapshots/VM_A/s4/s4.delta
    pR2,             ⟶   /snapshots/VM_A/s3/s3.delta
    pR3              ⟶   /snapshots/VM_A/s2/s2.delta
}

FIG. 2F

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

```
Virtual Machine B, Version V1 {
    pBase2,
    pR11,
    pR12,
    pR1,
    pR2,
    pF3
}
```

```
Virtual Machine C, Version V2 {
    pBase2,
    pR11,
    pF5,
    pF6
}
```

Virtual Machine A, Version VS {
    pBaseA,
    pR4,
}

Virtual Machine A, Version VU {
    pBaseB,
    pR1,
    pR2,
    pR3
}

```
Virtual Machine A, Version VU {
    pBaseA,
    pF9
}
```

| VM Versions | Snapshot Chain | First Sub-Chain | Second Sub-Chain |
|---|---|---|---|
| Version V1 | R4 | RA4 | RB4 |
| Version V2 | R3 | RA3 | RB3 |
| Version V3 | R2 | RA2 | RB2 |
| Version V4 | R1 | RA1 | RB1 |
| Version V5 | Base ⌒402 → | BaseA ⌒404 | BaseB ⌒406 |
| Version V6 | F1 | FA1 | FB1 |
| Version V7 | F2 | FA2 | FB2 |
FIG. 4A
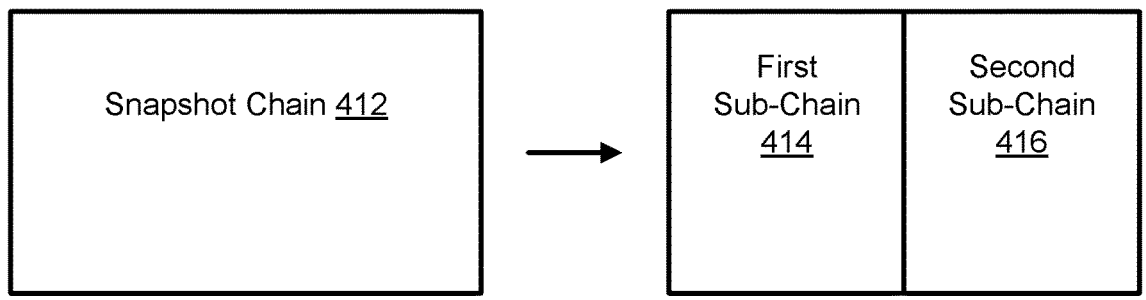
FIG. 4B
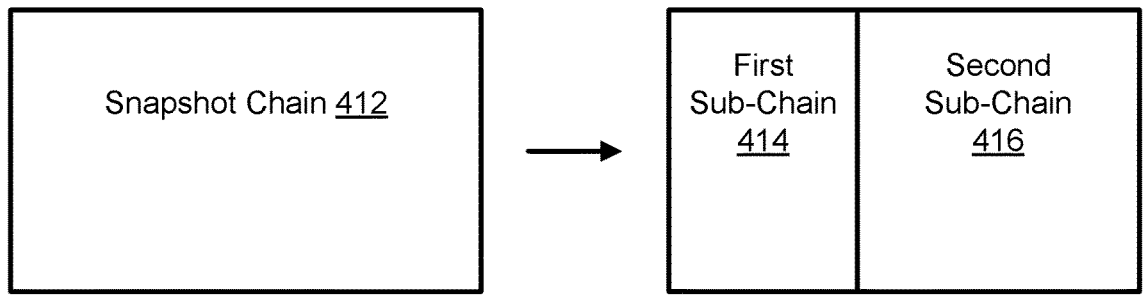
FIG. 4C

| VM Versions | Snapshot Chain | First Sub-Chain | Second Sub-Chain |
|---|---|---|---|
| Version V1 | R4 | RA4 | RB4 |
| Version V2 | R3 | RA3 | RB3 |
| Version V3 | R2 | RA2 ⌒443 | RB2 |
| Version V4 | R1 | RA1 ⌒442 | RB1 |
| Version V5 | Base ⌒402 → | BaseA ⌒404 | RB12 ⌒438 |
| Version V6 | F1 | FA1 | RB11 ⌒437 |
| Version V7 | F2 | FA2 | 436 ↘ BaseB2 |

FIG. 4I

| VM Versions | Snapshot Chain | First Sub-Chain | Second Sub-Chain |
|---|---|---|---|
| Version V1 | R4 | RA4C | RB4C |
| Version V2 | R3 | | |
| Version V3 | R2 | RA2C ⌒444 | RB2C |
| Version V4 | R1 | | |
| Version V5 | Base → | BaseA ⌒404 | RB12C ⌒441 |
| Version V6 | F1 | FA1 | |
| Version V7 | F2 | FA2 | 436 ↘ BaseB2 |

FIG. 4J

SHARDING OF FULL AND INCREMENTAL SNAPSHOTS

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 4A depicts one embodiment of sets of electronic files for capturing different point in time versions of a virtual machine.

FIG. 4B depicts one embodiment of a snapshot chain being split into two snapshot sub-chains.

FIG. 4C depicts another embodiment of a snapshot chain being split into two snapshot sub-chains.

FIG. 4I depicts one embodiment of the two snapshot sub-chains of FIG. 4A in which snapshot sub-chain operations have been independently performed on the two snapshot sub-chains.

FIG. 4J depicts one embodiment of the two snapshot sub-chains of FIG. 4I in which snapshot sub-chain operations have been independently performed on the two snapshot sub-chains.

DETAILED DESCRIPTION

Figure 1A:
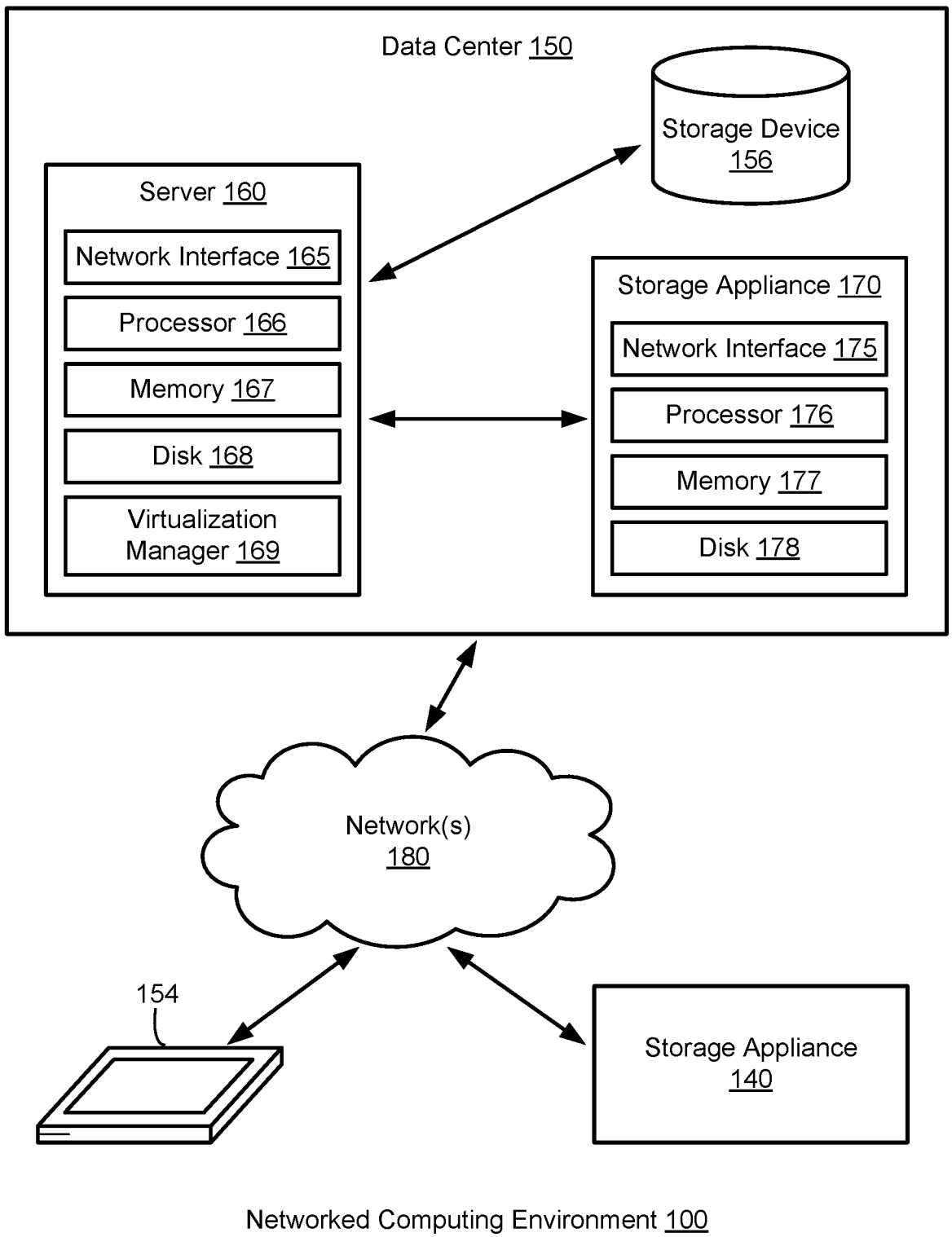
FIG. 1A depicts one embodiment of a networked computing environment.

Technology is described for backing up and restoring different point in time versions of a virtual machine, an application, a database, or an electronic file using independently managed snapshot chains and independently managed snapshot sub-chains. In some cases, different point in time versions of a virtual machine may be captured and stored using one or more snapshot chains (or one or more blob-chains). Each snapshot chain may correspond with a base image (or a full image snapshot) and one or more incremental files (e.g., a forward incremental file and a reverse incremental file) that derive from the base image. A snapshot chain may be split into a plurality of shards or sub-chains such that the width of each shard or the maximum data size of the files in each shard is less than a threshold data size (e.g., each file in a shard or sub-chain is less than 1 TB or 200 GB). Data operations (e.g., read, write, replication, archival, consolidation, or reverse operations) may be performed on the individual shards or sub-chains in parallel or at the same time.

One issue with having snapshot chains comprising files with large file sizes (e.g., larger than 1 TB) is that performing operations, such as a consolidation operation or a reverse operation, may not be possible if the amount of available disk space is less than a threshold amount of disk space (e.g., the amount of available disk space is less than 2 TB). The difficulty stems from the fact that the original snapshot chain or blob-chain must remain available while a consolidation operation or reverse operation is being performed to generate a new snapshot chain or blob-chain. In some cases, when a cluster of storage nodes approaches a high level of storage utilization, the remaining data storage may be insufficient for additional working-copy, which may prevent some snapshot chains from being consolidated and therefore continue to consume disk space in an already disk-space starved environment. One benefit of splitting a snapshot chain into a plurality of shards or sub-chains such that the width of each shard or the file sizes in each shard is less than a threshold data size (e.g., less than 1 TB) is that working-copy during reversals and consolidations may be less of a problem in clusters with high storage utilization. Moreover, each of the shards or sub-chains may be replicated in parallel and each of the shards or sub-chains may be read from or written to in parallel or at the same time, thereby improving read and write performance.

In one embodiment, a first snapshot chain may correspond with snapshots of a virtual machine captured between a first point in time and a second point in time and a second snapshot chain may correspond with snapshots of the virtual machine captured between a third point in time subsequent to the second point in time and a fourth point in time. In some cases, the first snapshot chain may be in series with the second snapshot chain. For example, the first snapshot chain may comprise hourly snapshots of the virtual machine captured during a first time period (e.g., captured on a Thursday) and the second snapshot chain may comprise hourly snapshots of the virtual machine captured during a second time period subsequent to the first time period (e.g., captured on the Friday after the Thursday).

The first snapshot chain may comprise a first snapshot chain length of a first number of snapshot files and the second snapshot chain may comprise a second snapshot chain length of a second number of files different from the first number of snapshot files. The first snapshot chain may include a first base image and a first set of incremental files that derive from the first base image. The second snapshot chain may include a second base image and a second set of incremental files that derive from the second base image. A first operation (e.g., a consolidation, a rebasing, or a reverse operation) may be performed on the first snapshot chain while a second operation is performed on the second snapshot chain. A rebasing operation may be performed on the electronic files within the first snapshot chain to reduce the number of forward incremental files within the first snapshot chain. A consolidation operation may be performed on the electronic files within the first snapshot chain to reduce the total number of incremental files within the first snapshot chain. In one example, a consolidation operation may be performed on the first snapshot chain while a reverse operation is performed on the second snapshot chain. In another example, a first consolidation operation may be performed on the first snapshot chain while a second consolidation operation is performed on the second snapshot chain. In some cases, the number of snapshots in the first snapshot chain may be reduced over time as older versions of the virtual machine are consolidated, archived, deleted, or moved to a different storage domain (e.g., to cloud storage).

In some embodiments, a first snapshot chain may be partitioned into parallel sub-chains or shards that can be individually managed. The parallel splitting of the first snapshot chain into parallel sub-chains may be allow for parallel processing of the shards and for each shard to be independently processed. In one example, a consolidation operation may be performed on a first shard of the first snapshot chain while a reverse operation is performed on a second shard of the first snapshot chain. In another example, a first consolidation operation may be performed on a first shard of the first snapshot chain while a second consolidation operation is performed on a second shard of the first snapshot chain. In another example, a first rebasing operation may be performed on a first shard of the first snapshot chain while a second rebasing operation is performed on a second shard of the first snapshot chain. The new base images generated by the first rebasing operation and the second rebasing operation may not necessarily align with each other. For example, the new base images may correspond with the different point in time versions of the virtual machine.

In some cases, one or more configuration parameters for a data storage system may be used to set the maximum snapshot width in terms of data size or set the maximum file size for files within a snapshot chain such that a snapshot chain that includes a file that exceeds the maximum file size is split into two or more shards. In one example, a first snapshot chain with a first base file of size 2.5 TB may be split or converted into a second shard with a second base file of size 1 TB, a third shard with a third base file of size 1 TB, and a fourth shard with a fourth base file of size 0.5 TB. Incremental snapshots may be sharded at the same logical boundaries as the base files and may be shard-wise linked to their corresponding shard base files.

In some embodiments, the maximum snapshot width or the maximum data size for electronic files within a snapshot chain may be set based on an amount of available disk space, which may increase or decrease over time as storage nodes are added to or removed from a cluster of storage nodes and as files are added to or deleted from the cluster. The maximum data size for the electronic files within the snapshot chain may be set based on the total number of nodes within the cluster. The maximum data size for the electronic files within the snapshot chain may be set based on a snapshot frequency for capturing the snapshots. In one example, if the snapshot frequency is capturing snapshots every hour, then the maximum data size for the electronic files within the snapshot chain may be set to 1 TB; however, if the snapshot frequency is capturing snapshots every 15 minutes, then the maximum data size for the electronic files within the snapshot chain may be set to 200 GB. In some cases, the higher the snapshot frequency, the smaller the maximum data size for the electronic files within the snapshot chain. The maximum data size for the electronic files within the snapshot chain may be set based on a prior history of data changes or based on an average data change rate for the snapshot chain. In one example, if a threshold number of data changes have occurred within a subset of the snapshots (e.g., within the most recent ten snapshots), then the maximum data size for the electronic files within the snapshot chain may be reduced from 1 TB to 200 GB.

In some embodiments, the shards or snapshot sub-chains may be of uniform widths or of non-uniform widths. In one example, a partition may have three shards in which the first shard may have a width or maximum data size of 1 TB, the second shard may have a width or maximum data size of 1 TB, and the third shard may have a width or maximum data size of 1 TB. In another example, a partition may have three shards in which the first shard may have a width or maximum data size of 1 TB, the second shard may have a width or maximum data size of 500 GB, and the third shard may have a width or maximum data size of 200 GB. In some cases, the widths of the shards may be adjusted over time causing two shards to be repartitioned as three shards or causing two shards to be collapsed back to one snapshot chain. In one example, if the available disk space is above a threshold disk space (e.g., the available disk space is greater than 20 TB), then two snapshot sub-chains may be merged or collapsed back to a single snapshot chain. In another example, if the available disk space is below a threshold disk space (e.g., the available disk space is less than 10 TB), then a single snapshot chain may be split into two or more shards. In another example, if the available disk space is below a threshold disk space (e.g., the available disk space is less than 5 TB), then four shards of a first maximum data size (e.g., 1 TB) may be split into eight shards of a second maximum data size (e.g., 500 GB) less than the first maximum data size. Although there may be a performance penalty for adjusting the number of shards, increasing the number of shards may allow for a greater number of consolidation operations to occur, which may free up disk space or increase the amount of available disk space for storing additional data.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
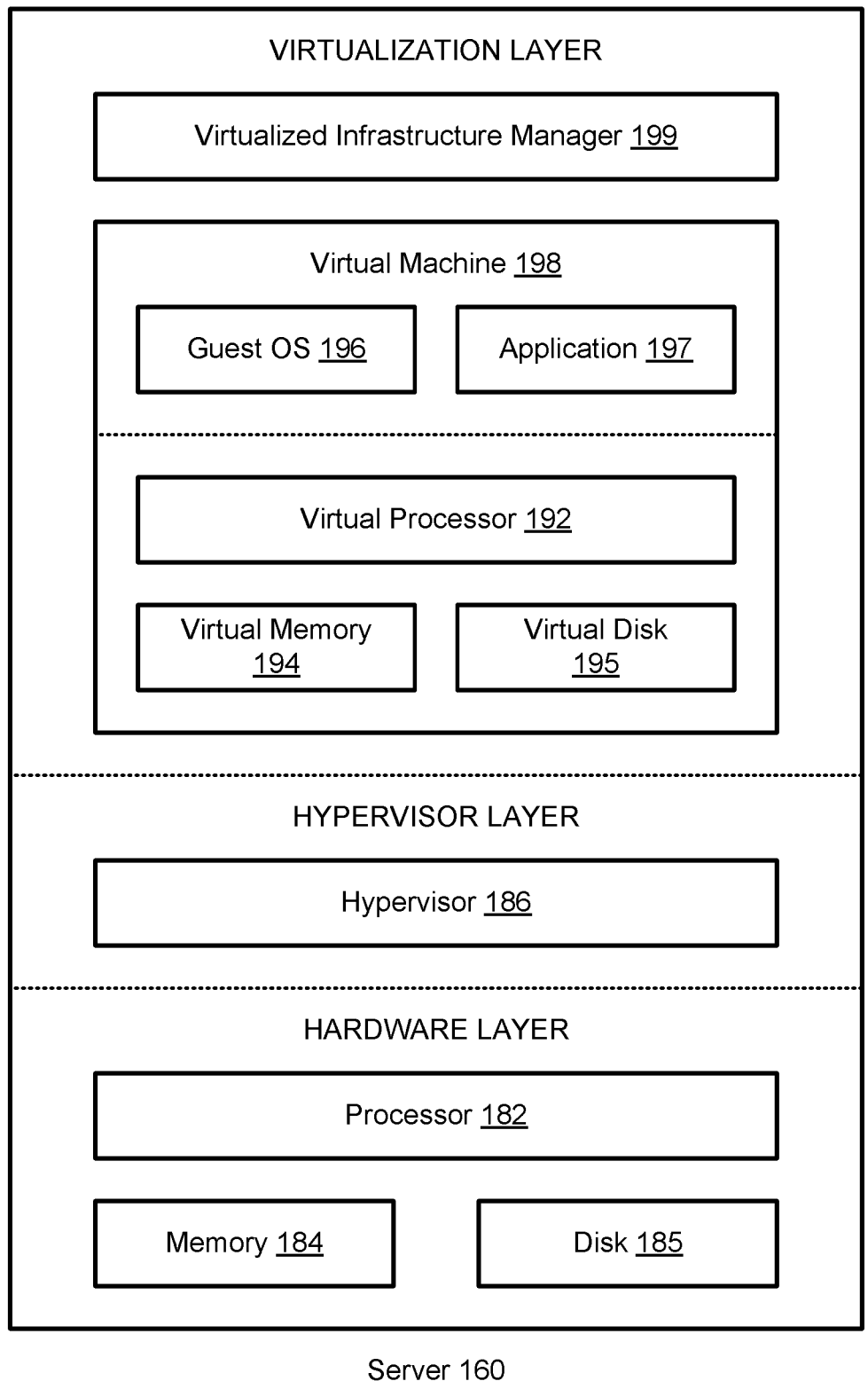
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
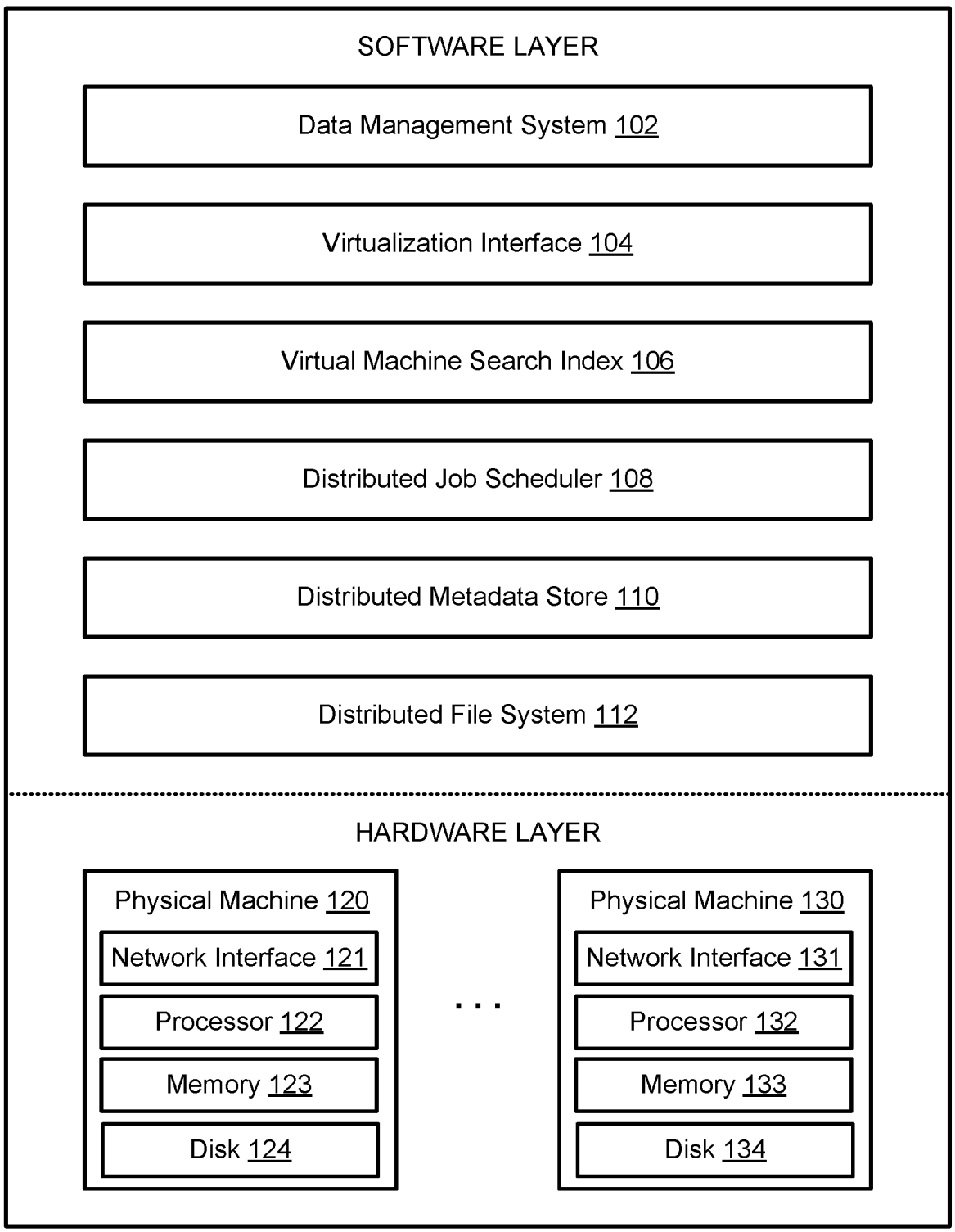
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
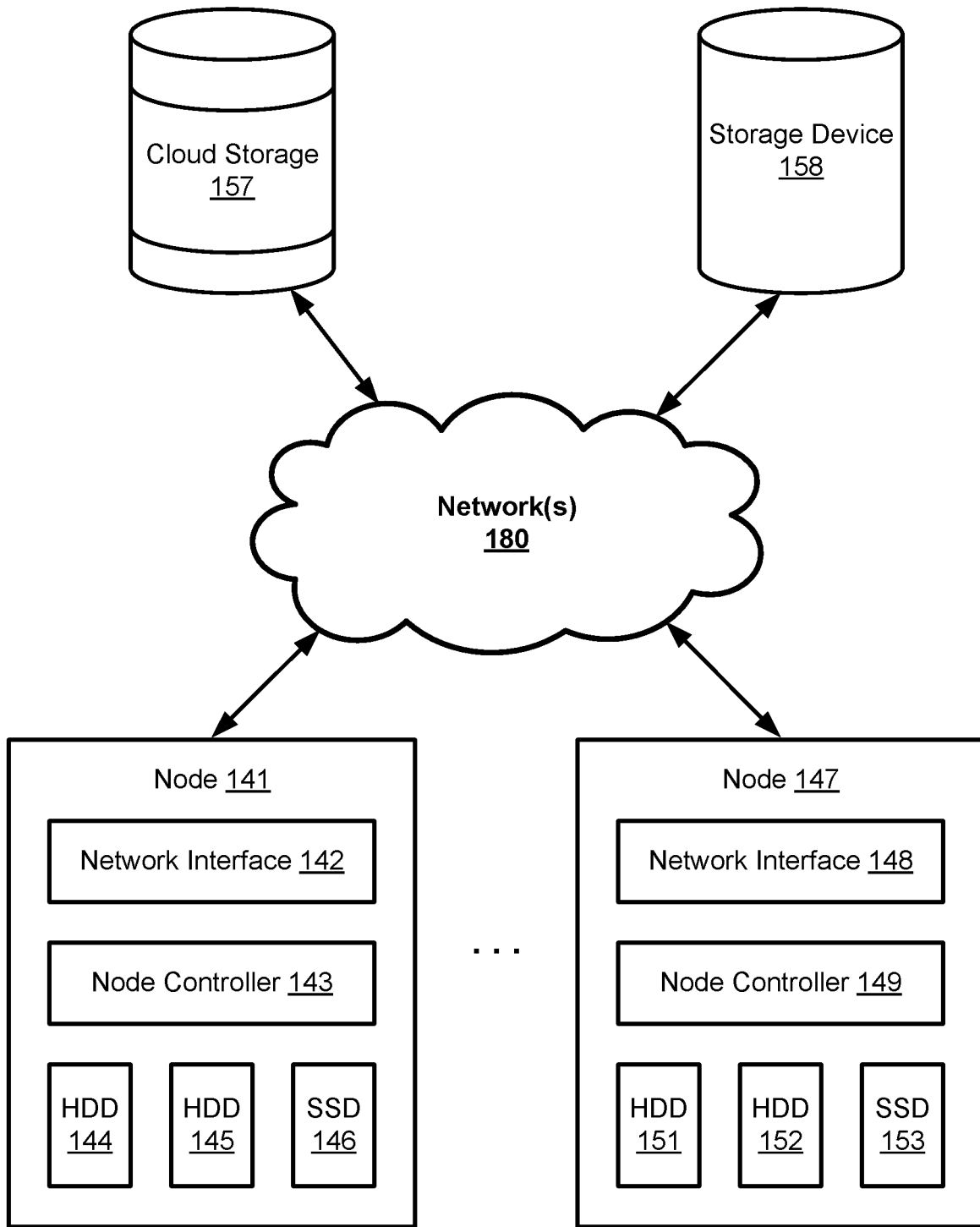
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2A, 2B, 2C:
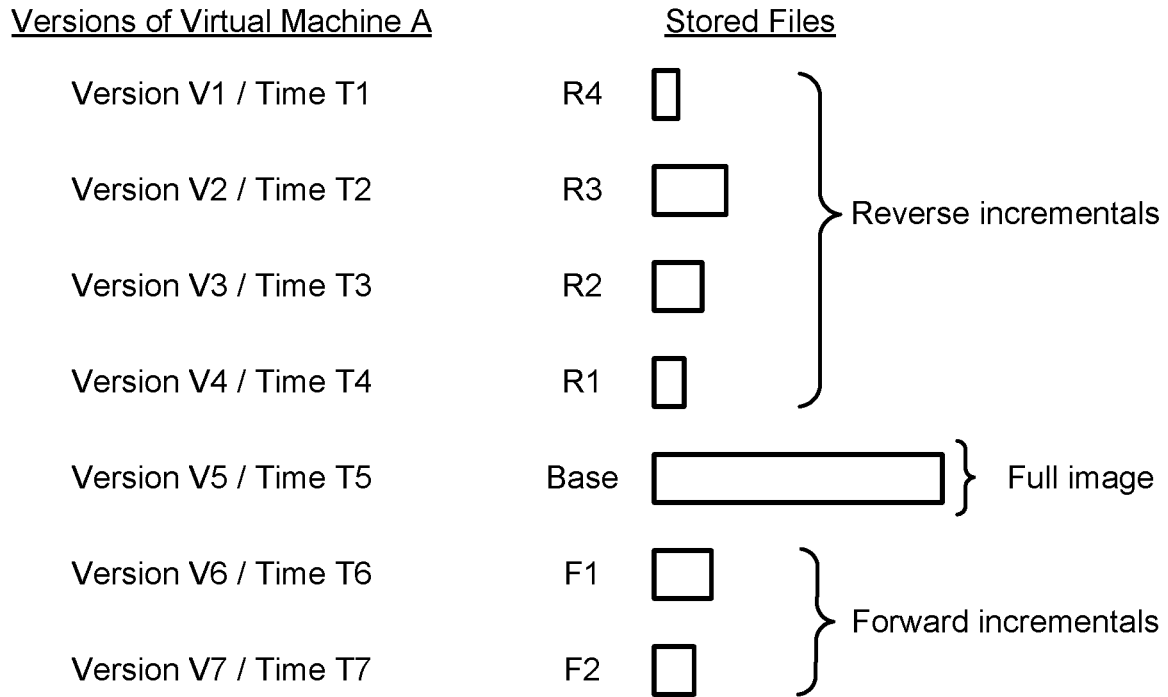
FIGS. 2A-2Q depict various embodiments of sets of files and data structures associated with managing and storing snapshots of virtual machines.
Figures 2G, 2H, 2I:
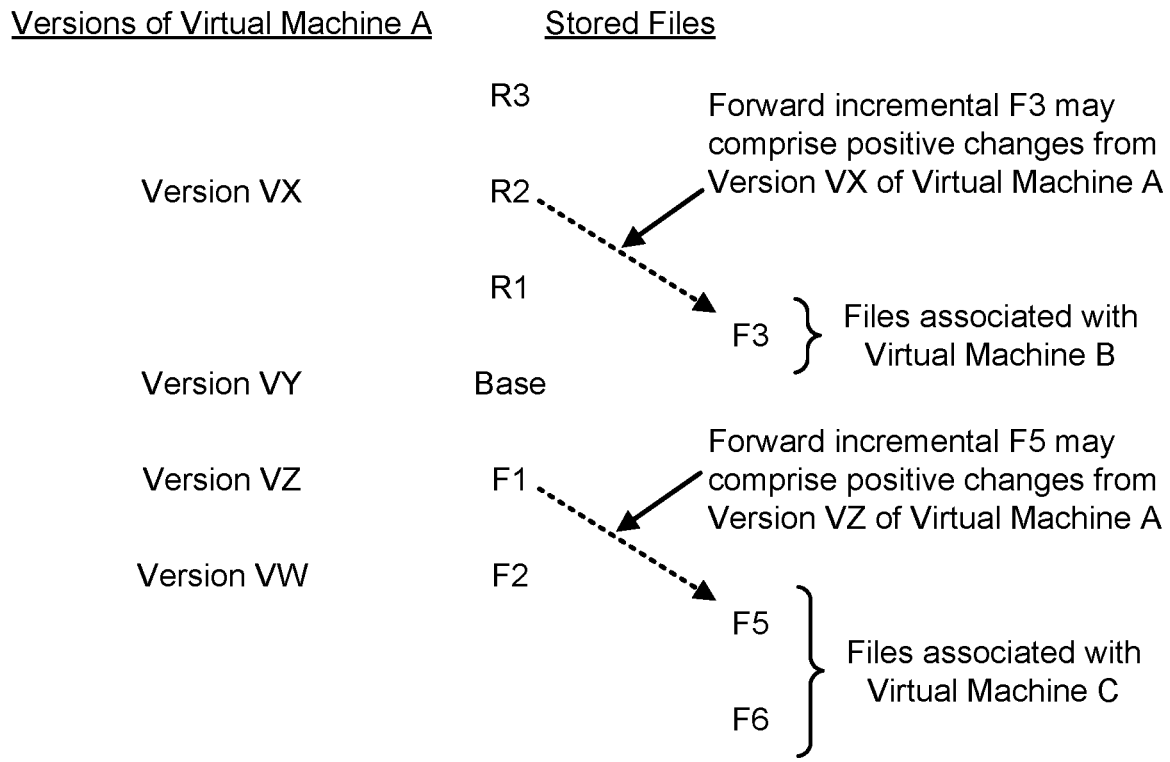
Figures 2J, 2K, 2L:
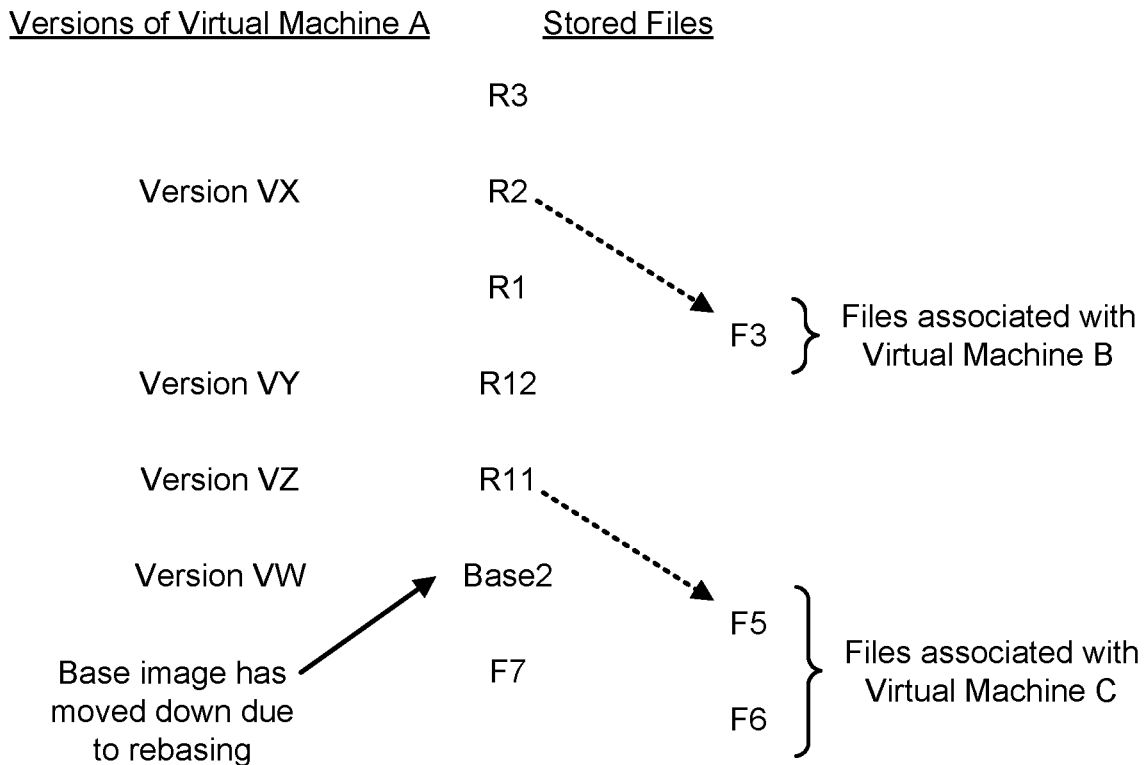
Figures 2M, 2N, 2O:
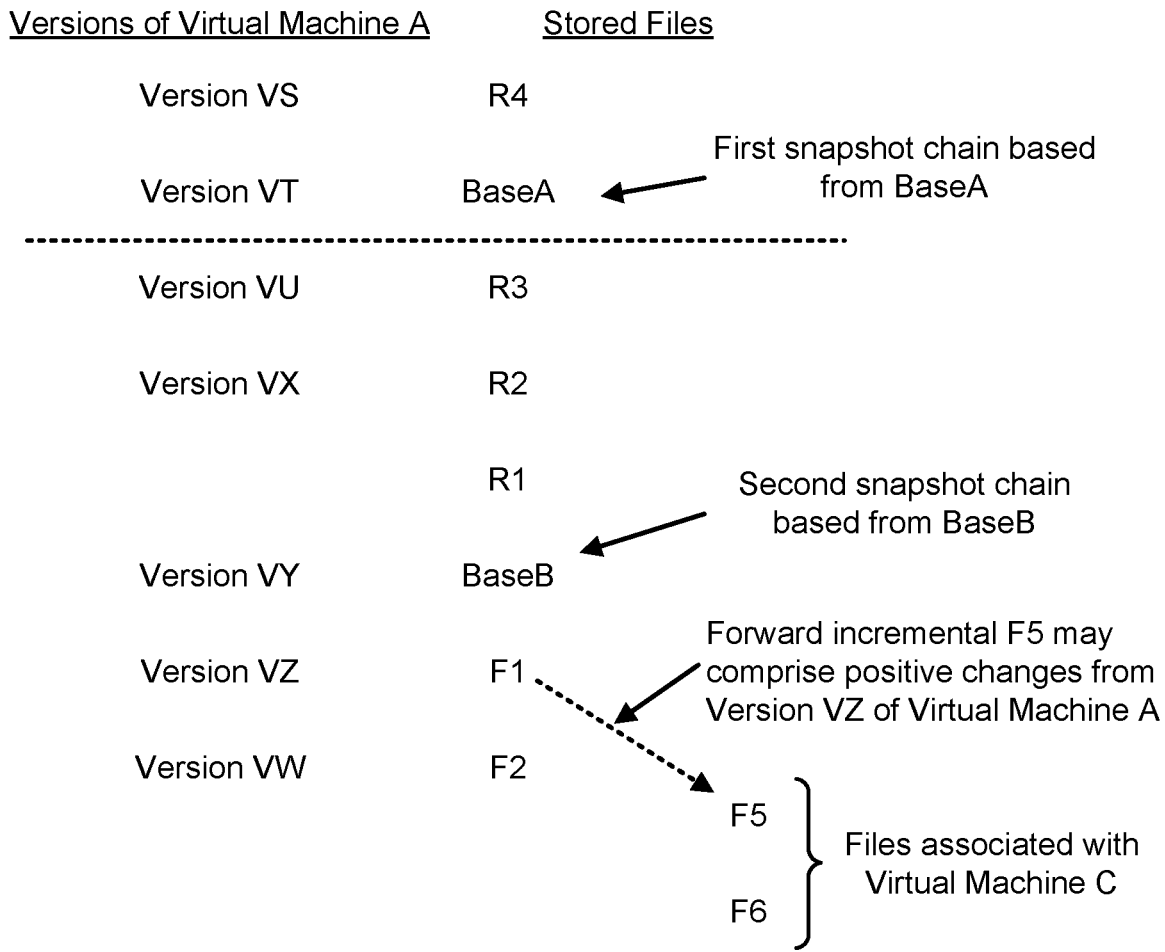
Figures 2P, 2Q:
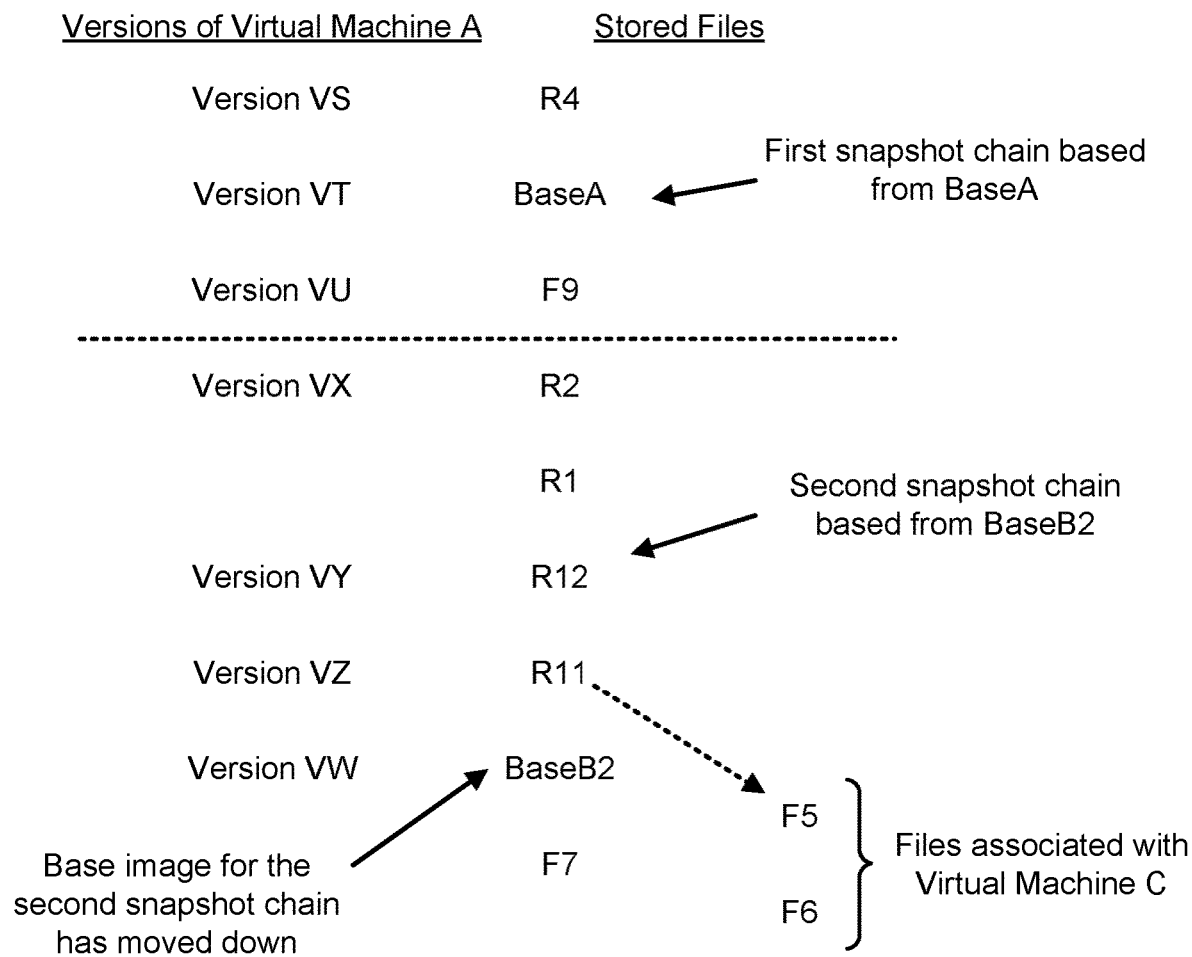

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) or a reverse operation may be triggered when a number of forward incremental files is greater than a threshold number of forward incremental files for a snapshot chain (e.g., more than 200 forward incremental files). In other cases, a rebasing operation or a reverse operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
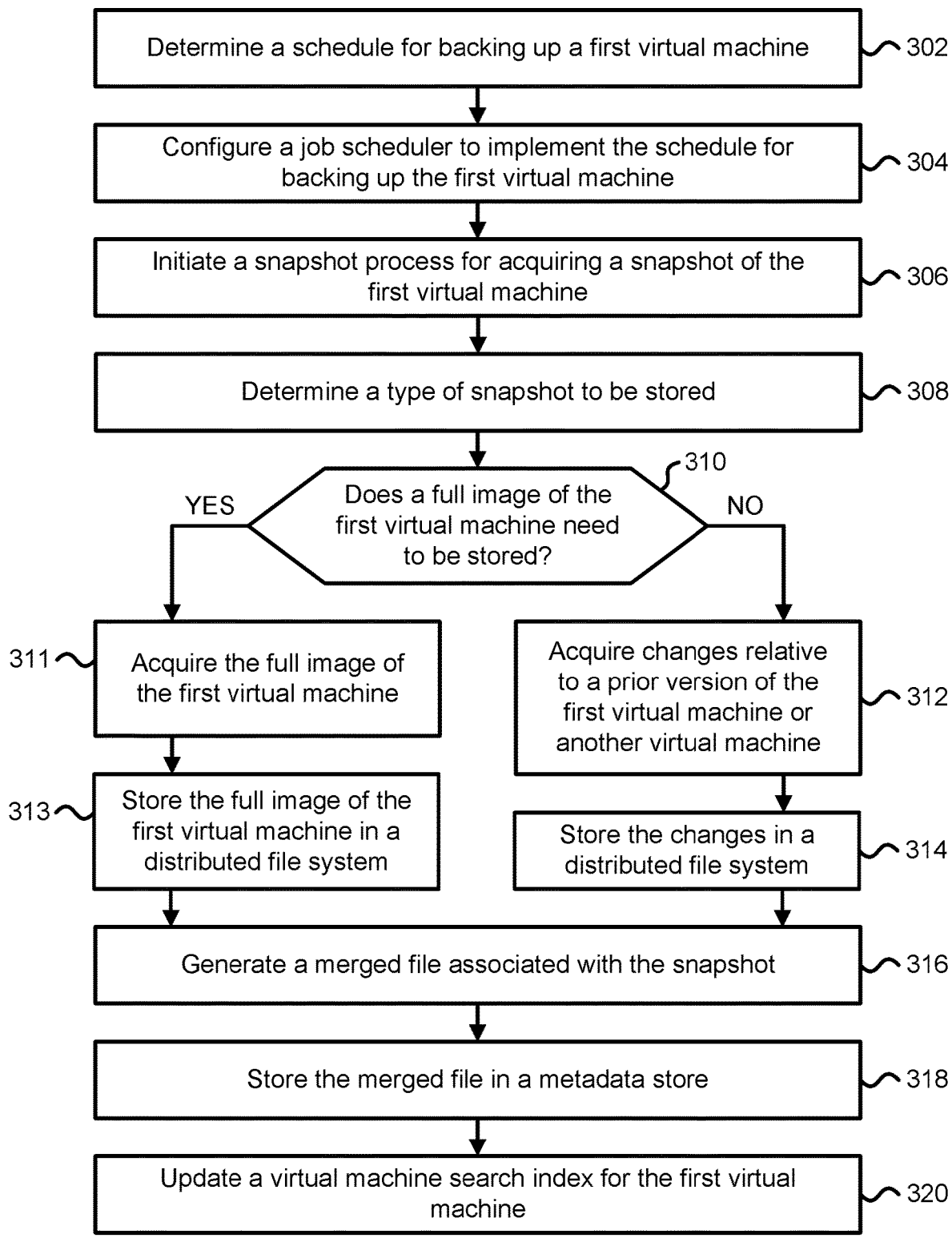
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
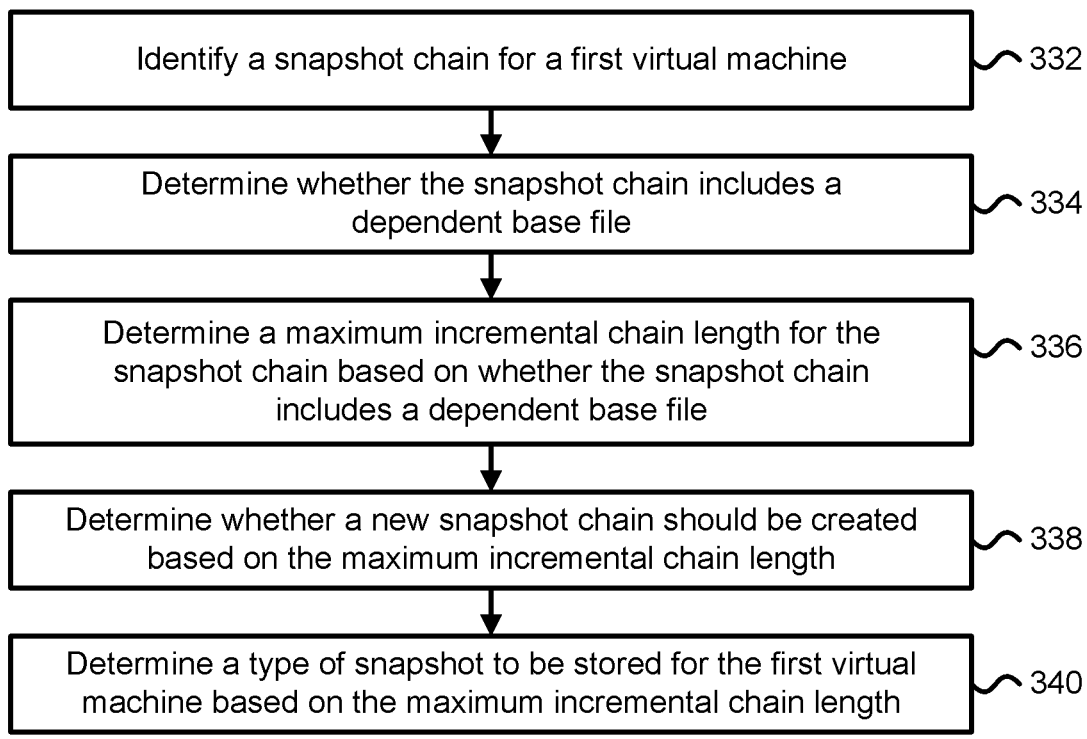
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
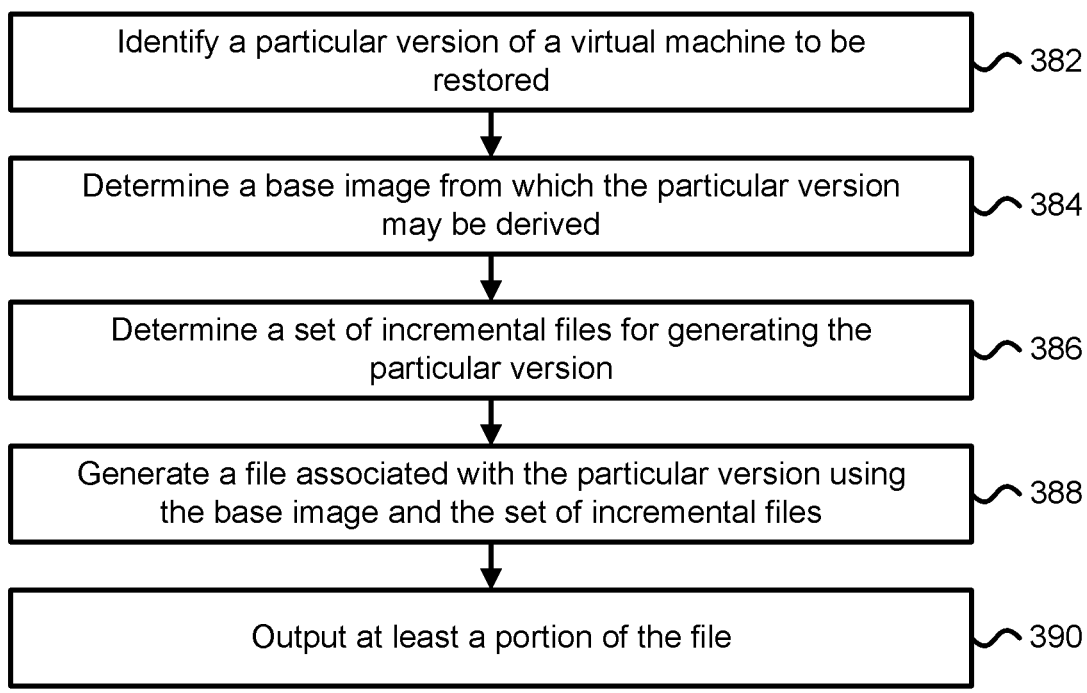
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted (e.g., the entire file or a portion of the file may be outputted). The at least the portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image on which a dependent base file may depend and to generate the dependent base file.

FIG. 4A depicts one embodiment of sets of electronic files for capturing different point in time versions of a virtual machine. The sets of electronic files may be stored using a distributed file system, such as distributed file system 112 in FIG. 1C. As depicted, a first set of files corresponding with a snapshot chain includes a set of reverse incrementals (R1-R4), a full image 402 (Base), and a set of forward incrementals (F1-F2). The different point in time versions of the virtual machine (versions V1-V7 of Virtual Machine VM) were captured and stored using the first set of files. The first set of files may be partitioned or split into two or more snapshot sub-chains or shard chains. As depicted, the full image 402 (Base) may be partitioned into a first full image 404 (BaseA) and a second full image 406 (BaseB). In one example, the full image 402 may comprise an electronic file of size 1 TB, the first full image 404 may comprise an electronic file of size 500 GB, and the second full image 406 may comprise an electronic file of 500 GB. In another example, the full image 402 may comprise an electronic file of size 1 TB, the first full image 404 may comprise an electronic file of size 800 GB, and the second full image 406 may comprise an electronic file of 200 GB. The partitioning of the full image 402 may create a plurality of uniformly sized base images or a plurality of base images corresponding with a plurality of snapshot sub-chains that have uniform maximum data sizes or non-uniform maximum data sizes.

As depicted in FIG. 4A, a second set of files corresponding with a first snapshot sub-chain includes a set of reverse incrementals (RA1-RA4), a full image 404 (BaseA), and a set of forward incrementals (FA1-FA2). A third set of files corresponding with a second snapshot sub-chain includes a set of reverse incrementals (RB1-RB4), a full image 406 (BaseB), and a set of forward incrementals (FB1-FB2). The different point in time versions of the virtual machine (versions V1-V7 of Virtual Machine VM) may be generated and outputted using the second set of files corresponding with the first snapshot sub-chain and the third set of files corresponding with the second snapshot sub-chain.

In some cases, a first set of operations (e.g., reverse, consolidate, rebase, read, and/or write operations) may be performed on the second set of files corresponding with the first snapshot sub-chain independently of a second set of operations being performed on the third set of files corresponding with the second snapshot sub-chain. The first set of operations may comprise snapshot chain manipulation operations, such as a reverse operation or a consolidation operation, that generate new files for a snapshot chain or a snapshot sub-chain. In one example, the full image 404 may be read in parallel with the full image 406. In another example, a first rebasing operation may be performed on the first snapshot sub-chain while a second rebasing operation may be performed on the second snapshot sub-chain. In this case, the first rebasing operation may generate a new first base image for the first snapshot sub-chain and the second rebasing operation may generate a new second base image for the second snapshot sub-chain. The generated base images may be aligned such that the new first base image may correspond with a particular version of the virtual machine (e.g., Version V7 of the Virtual Machine VM) and the new second base image may correspond with the particular version of the virtual machine. In some cases, the generated base images may not be aligned such that the new first base image may correspond with a particular version of the virtual machine (e.g., Version V7 of the Virtual Machine VM) and the new second base image may correspond with a different version of the virtual machine (e.g., Version V6 of the Virtual Machine VM).

In some embodiments, the determination of whether to convert or split the first set of files corresponding with the snapshot chain into the second set of files corresponding with the first snapshot sub-chain and the third set of files corresponding with the second snapshot sub-chain may depend upon the detection of one or more triggering conditions. The triggering conditions may include detection that the amount of available disk space has fallen below a threshold amount of available disk space (e.g., has fallen below or is less than 20 TB), detection that there has been a change in snapshot frequency (e.g., the snapshot frequency may have changed from capturing snapshots every 6 hours to every 4 hours), and/or detection that the total number of snapshots captured for the virtual machine is greater than a threshold number (e.g., the total number of snapshots has exceeded more than 1000 snapshots or the total number of point in time versions backed-up for the virtual machine has exceeded more than 400 versions).

FIG. 4B depicts one embodiment of a snapshot chain including a base image and one or more incrementals that derive from the base image being converted or split into a first snapshot sub-chain 414 and a second snapshot sub-chain 416. In some cases, the first snapshot sub-chain 414 and the second snapshot sub-chain 416 may have uniform widths or maximum files sizes. In one example, the files corresponding with the first snapshot sub-chain 414 may have a maximum file size (e.g., files sizes not greater than 1 TB) and the files corresponding with the second snapshot sub-chain 416 may also have the same maximum file size.

FIG. 4C depicts one embodiment of a snapshot chain including a base image and one or more incrementals that derive from the base image being converted or split into a first snapshot sub-chain 414 and a second snapshot sub-chain 416. As depicted, the first snapshot sub-chain 414 and the second snapshot sub-chain 416 may have different widths or different maximum files sizes. In one example, the files corresponding with the first snapshot sub-chain 414 may have a first maximum file size (e.g., files sizes not greater than 1 TB) and the files corresponding with the second snapshot sub-chain 416 may have a second maximum file size (e.g., files sizes not greater than 500 GB) different from the first maximum file size.

Figure 4D:
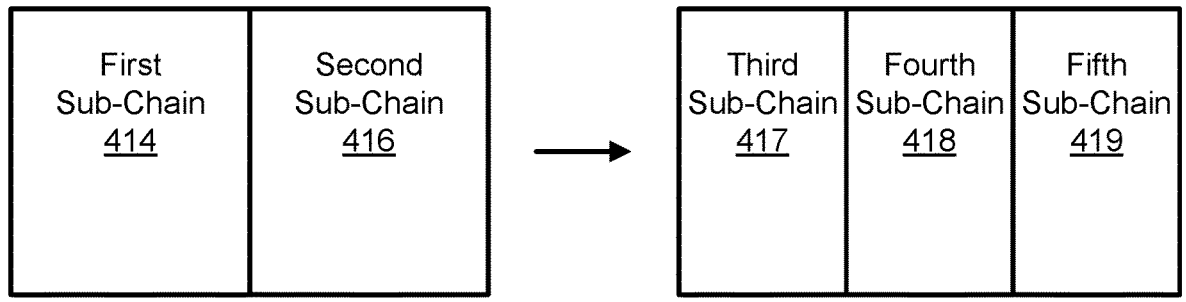
FIG. 4D depicts one embodiment of two snapshot sub-chains being split into three snapshot sub-chains.

FIG. 4D depicts one embodiment of two snapshot sub-chains 414 and 416 being converted into three snapshot sub-chains 417-419. In this case, the first snapshot sub-chain 414 may include a first base image and a first set of incrementals that derive from the first base image and the second snapshot sub-chain 416 include a second base image and a second set of incrementals that derive from the second base image. The three snapshot sub-chains 417-419 may include a third snapshot sub-chain 417, a fourth snapshot sub-chain 418, and a fifth snapshot sub-chain 419. The third snapshot sub-chain 417 may include a third base image and a third set of incremental files that derive from the third base image. The fourth snapshot sub-chain 418 may include a fourth base image and a fourth set of incremental files that derive from the fourth base image. The fifth snapshot sub-chain 419 may include a fifth base image and a fifth set of incremental files that derive from the fifth base image. The first base image of the first snapshot sub-chain 414 and the second base image of the second snapshot sub-chain 416 may be used to generate a combined base image corresponding with a particular version of a virtual machine. The third base image of the third snapshot sub-chain 417, the fourth base image of the fourth snapshot sub-chain 418, and the fifth base image of the fifth snapshot sub-chain 419 may be used to also generate the combined base image corresponding with the particular version of the virtual machine.

In some embodiments, the determination of whether to increase the number of snapshot sub-chains (e.g., by converting or splitting two snapshot sub-chains into three snapshot sub-chains) may depend upon the detection of one or more triggering conditions. The triggering conditions may include detection that the amount of available disk space has fallen below a threshold amount of available disk space (e.g., has fallen below or is less than 10 TB), detection that there has been a change in snapshot frequency (e.g., the snapshot frequency may have changed from capturing snapshots every 24 hours to every 4 hours), and/or detection that the total number of snapshots captured for the virtual machine has exceeded a threshold number (e.g., the total number of snapshots has exceeded more than 1000 snapshots).

Figure 4E:
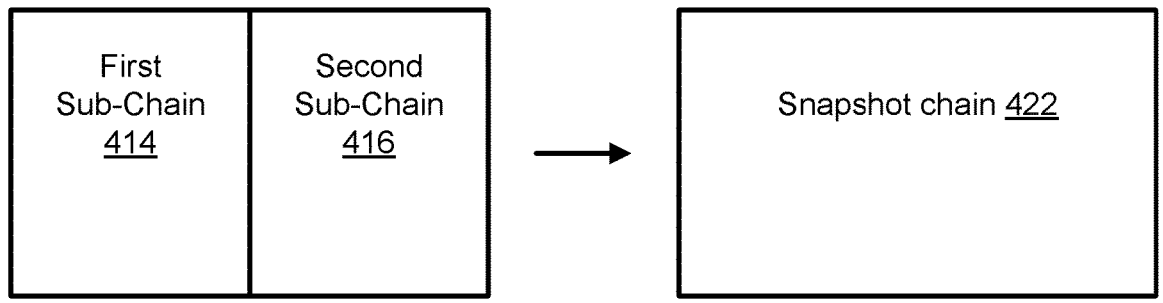
FIG. 4E depicts one embodiment of two snapshot sub-chains being consolidated into a consolidated snapshot chain.

FIG. 4E depicts one embodiment of two snapshot sub-chains 414 and 416 being consolidated into a consolidated snapshot chain 422. In this case, the first snapshot sub-chain 414 may include a first base image and a first set of incrementals that derive from the first base image and the second snapshot sub-chain 416 include a second base image and a second set of incrementals that derive from the second base image. The consolidated snapshot chain 422 may include a third base image and a third set of incrementals that derive from the third base image. The third base image may be equivalent to the combination of the first base image and the second base image. The third base image may correspond with a full image snapshot of a particular version of a virtual machine. A combination of the first base image and the second base image may also correspond with the full image snapshot of the particular version of the virtual machine.

In some embodiments, the determination of whether to decrease the number of snapshot sub-chains (e.g., by consolidating two snapshot sub-chains into a single snapshot chain) may depend upon the detection of one or more triggering conditions. The triggering conditions may include detection that the amount of available disk space is greater than a threshold amount of available disk space (e.g., has risen to be greater than 50 TB), detection that there has been a change in snapshot frequency (e.g., the snapshot frequency may have changed from capturing snapshots every 4 hours to every 24 hours), and/or detection that the total number of backed-up versions for the virtual machine is less than a threshold number (e.g., due to consolidation of previously captured snapshots of the virtual machine, the total number of back-up versions for the virtual machine has fallen below 500 versions of the virtual machine).

Figure 4F:
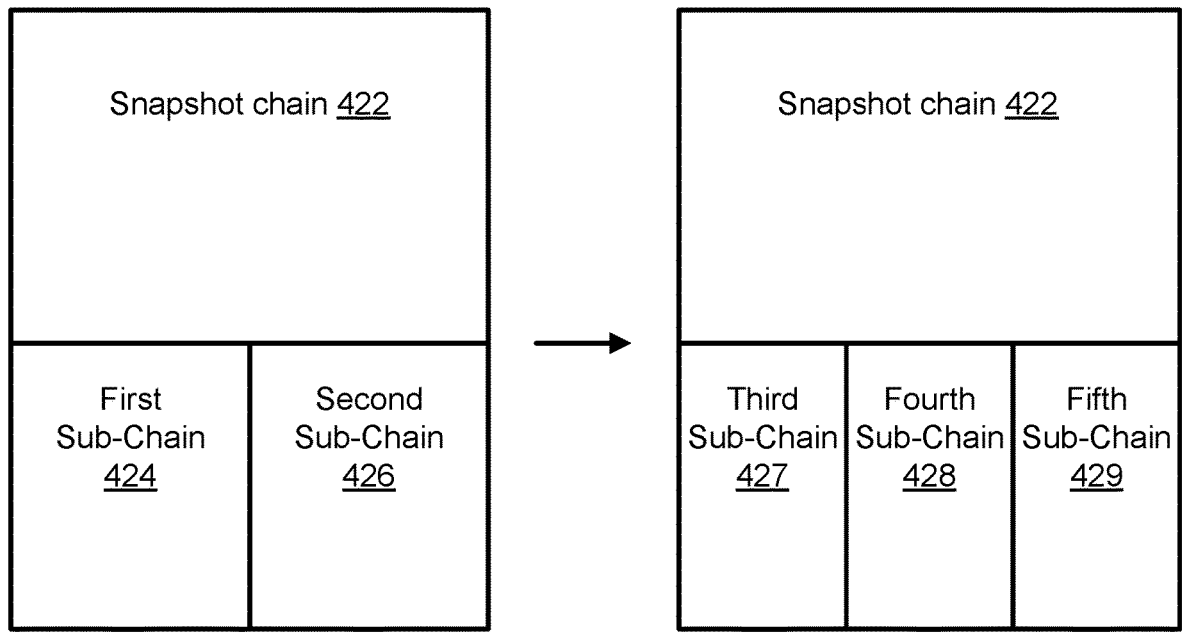
FIG. 4F depicts one embodiment of converting a portion of a snapshot chain into two or more snapshot sub-chains.

FIG. 4F depicts one embodiment of converting a portion of a snapshot chain into two or more snapshot sub-chains. As depicted, different point in time versions of a virtual machine have been captured and stored as a first set of files corresponding with the snapshot chain 422, a second set of files corresponding with the first snapshot sub-chain 424, and a third set of files corresponding with the second snapshot sub-chain 426. The second set of files corresponding with the first snapshot sub-chain 424 and the third set of files corresponding with the second snapshot sub-chain 426 may be converted into the three snapshot sub-chains 427-429.

In one embodiment, a portion of a snapshot chain (e.g., corresponding with the 100 most recent versions of a virtual machine out of 200 total versions of the virtual machine) may be split into two or more sub-chains. In another embodiment, a first set of backed-up versions of a virtual machine (e.g., versions V1-V100) may be stored as a first set of files corresponding with a single snapshot chain, such as snapshot chain 422 in FIG. 4F, and a second set of backed-up versions of the virtual machine (e.g., versions V101-V200) may be stored as files corresponding with two or more snapshot sub-chains, such as snapshot sub-chains 424 and 426 in FIG. 4F. Upon detection that an amount of available disk space for a cluster has fallen below a threshold amount of disk space, the two or more snapshot sub-chains may be converted into three or more snapshot sub-chains, such as snapshot sub-chains 427-429 in FIG. 4F.

In some embodiments, a first set of versions of a virtual machine may correspond with a top snapshot chain (e.g., snapshot chain 422 in FIG. 4F) and a second set of versions of the virtual machine may correspond with two or more snapshot sub-chains (e.g., snapshot sub-chains 424 and 426 in FIG. 4F). The top snapshot chain may be stored using a storage appliance, such as storage appliance 140 in FIG. 1A, or stored using a remote cluster repository (e.g., older snapshots may be moved to a second data center) or a cloud repository. The two or more snapshot sub-chains may be stored using the same storage appliance as that used to store the top snapshot chain. In some cases, the top snapshot chain may be stored using a remote cluster repository (e.g., located within a second data center) or a cloud repository and the bottom snapshot chain may be stored using a local storage appliance.

Figure 4G:
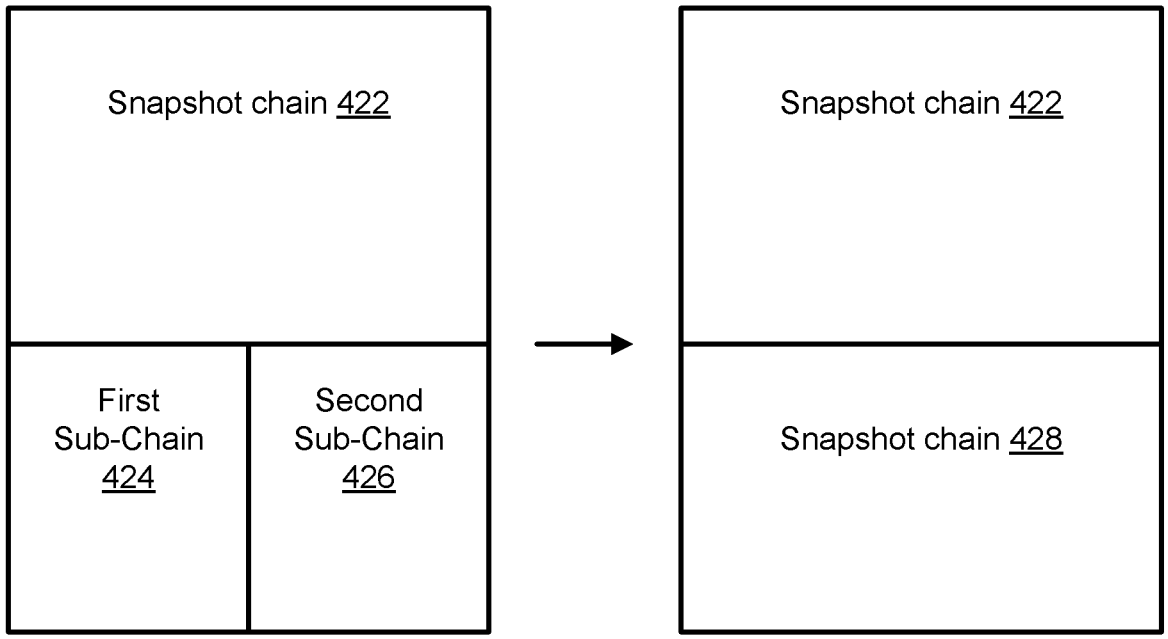
FIG. 4G depicts one embodiment of consolidating snapshot sub-chains associated with a subset of backed-up versions of a virtual machine into a single snapshot chain.

FIG. 4G depicts one embodiment of consolidating snapshot sub-chains associated with a subset of backed-up versions of a virtual machine into a single snapshot chain. As depicted, different point in time versions of a virtual machine have been captured and stored as a first set of files corresponding with the snapshot chain 422, a second set of files corresponding with the first snapshot sub-chain 424, and a third set of files corresponding with the second snapshot sub-chain 426. The second set of files corresponding with the first snapshot sub-chain 424 and the third set of files corresponding with the second snapshot sub-chain 426 may be consolidated into a single snapshot chain 428.

Figure 4H:
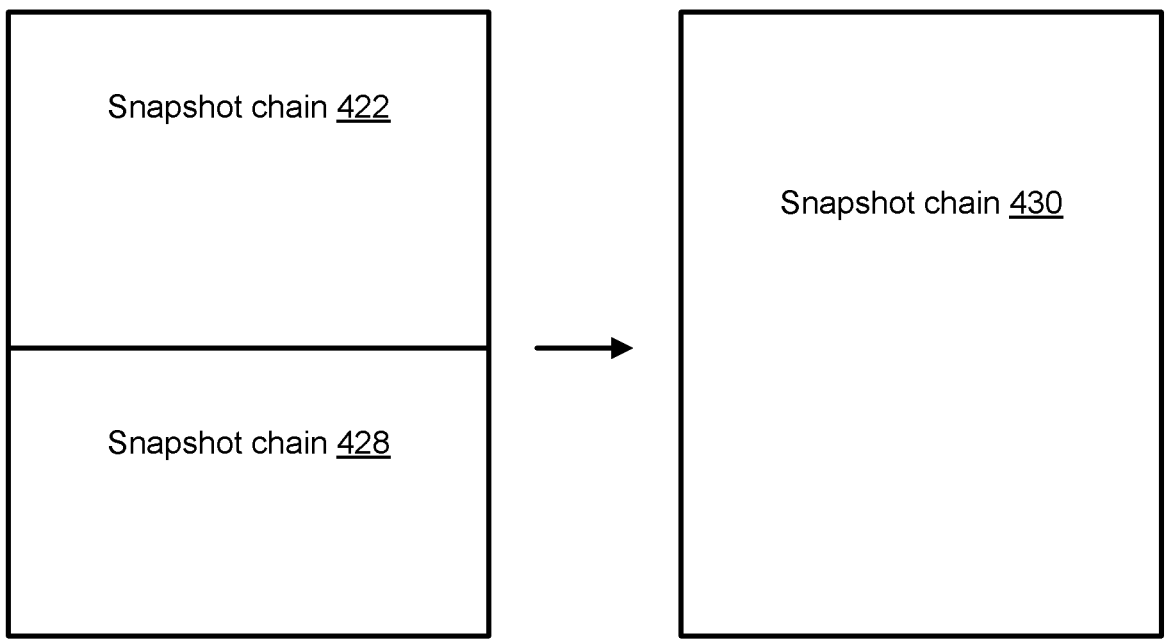
FIG. 4H depicts one embodiment of consolidating two snapshot chains into a single snapshot chain.

FIG. 4H depicts one embodiment of consolidating two snapshot chains into a single snapshot chain. As depicted, a first snapshot chain 422 may correspond with a first set of backed-up versions of a virtual machine (e.g., versions V1-V500) and a second snapshot chain 428 may correspond with a second set of backed-up versions of the virtual machine (e.g., versions V501-V600). The first snapshot chain 422 and the second snapshot chain 428 may be consolidated into a third snapshot chain 430. The third snapshot chain 430 may correspond with both the first set of backed-up versions of the virtual machine and the second set of backed-up versions of the virtual machine (e.g., versions V1-V600). The first snapshot chain 422 may include a first base image and a first set of incremental files that derive from the first base image. The second snapshot chain 428 may include a second base image and a second set of incremental files that derive from the second base image. The third snapshot chain 430 may include a third base image and a third set of incremental files that derive from the third base image. In some cases, the total number of electronic files for the third snapshot chain 430 may be equal to the number of electronic files for the first snapshot chain 422 plus the number of electronic files for the snapshot chain 428. One benefit of consolidating snapshot chains is that the number of base images (or full image snapshots) may be reduced.

In some embodiments, different versions of a virtual machine may correspond with a top snapshot chain (e.g., snapshot chain 422 in FIG. 4H) used for storing a first set of the different versions of the virtual machine and a bottom snapshot chain (e.g., snapshot chain 428 in FIG. 4H) used for storing a second set of the different versions of the virtual machine. Upon detection of a triggering event (e.g., the amount of available disk space has fallen below a threshold amount of disk space due to a node failure), the bottom snapshot chain may be split into two or more snapshot sub-chains or both the top snapshot chain and the bottom snapshot chain may both be split into two or more snapshot sub-chains. In some cases, the top snapshot chain may correspond with the first snapshot chain depicted in FIG. 2P and the bottom snapshot chain may correspond with the second snapshot chain depicted in FIG. 2P.

FIG. 4I depicts one embodiment of the two snapshot sub-chains of FIG. 4A in which snapshot sub-chain operations have been independently performed on the two snapshot sub-chains. As depicted, a new base image 436 (BaseB2) and two reverse incremental files 437-438 (RB11-RB12) have been generated for the second snapshot sub-chain. In this case, a reverse operation may have been performed using the second snapshot sub-chain in order to move the base image for the second snapshot sub-chain closer to the most recent version of the virtual machine comprising version V7.

FIG. 4J depicts one embodiment of the two snapshot sub-chains of FIG. 4I in which snapshot sub-chain operations have been independently performed on the two snapshot sub-chains. As depicted, two reverse incremental files (RA2C and RA4C) have been generated for the first snapshot sub-chain. The reverse incremental file 444 (RA2C) may be generated using the reverse incremental files 442-443 (RA1 and RA2) in FIG. 4I during a consolidation operation that consolidated the two reverse incremental files into one reverse incremental file. Three reverse incremental files (RB12C, RB2C, and RB4C) have been generated for the second snapshot sub-chain. The reverse incremental file 441 (RB12C) may be generated using the reverse incremental files 437-438 (RB11 and RB12) in FIG. 4I during a consolidation operation that consolidated the two reverse incremental files into one reverse incremental file. A consolidation operation may be used to combine multiple consecutive incrementals in a snapshot chain into a single incremental file (or delta file). In one embodiment, a first consolidation operation may have been performed using the first snapshot sub-chain and a second consolidation operation may have been performed using the second snapshot sub-chain. The first consolidation operation may have been performed in parallel with the second consolidation operation.

In some embodiments, although different point in time versions of a virtual machine are depicted in FIG. 4J, the different point in time versions may correspond with different point in time versions of a database or different versions of a database file associated with the database. The different point in time versions may correspond with different point in time versions of an electronic file (e.g., a spreadsheet or a virtual disk file).

Figure 5A:
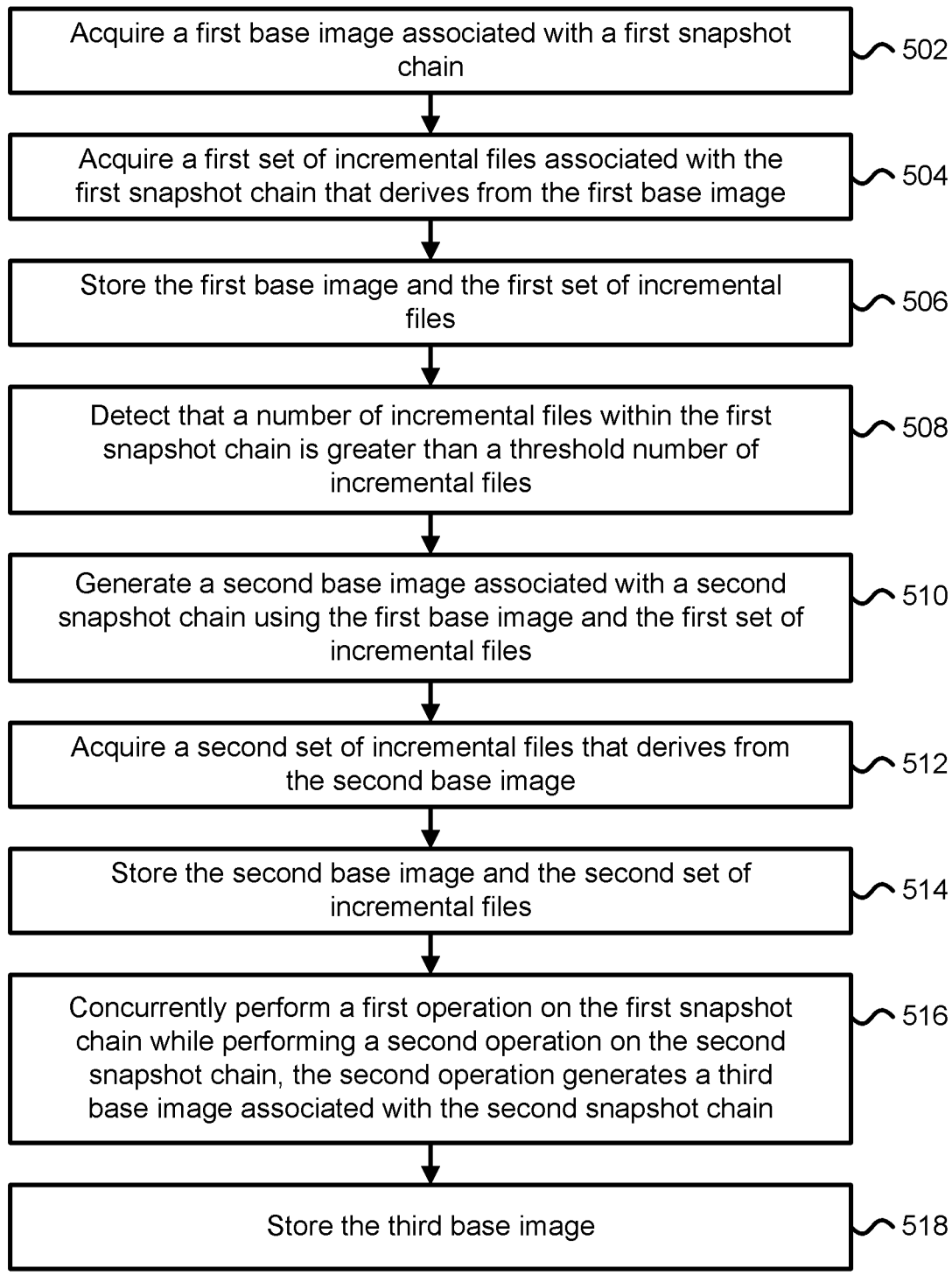
FIG. 5A is a flowchart describing one embodiment of a process for generating a new snapshot chain.

FIG. 5A is a flowchart describing one embodiment of a process for generating a new snapshot chain. In one embodiment, the process of FIG. 5A may be performed by a storage appliance, such as storage appliance 170 or storage appliance 140 in FIG. 1A.

In step 502, a first base image associated with a first snapshot chain is acquired. The first base image may be acquired from a server, such as server 160 in FIG. 1A. In step 504, a first set of incremental files associated with the first snapshot chain that derive from the first base image is acquired. The first set of incremental files may also be acquired from the server, such as server 160 in FIG. 1A. In one example, the first base image may correspond with base image BaseB2 in FIG. 2P and the first set of incremental files may correspond with forward incremental F7 in FIG. 2P. In step 506, the first base image and the first set of incremental files are stored. In one embodiment, the first base image may be stored using a first storage device of a first type (e.g., using a HDD) and the first set of incremental files may be stored using a second storage device of a second type (e.g., using a SSD). In step 508, it is detected that a number of incremental files within the first snapshot chain is greater than a threshold number of incremental files. In one example, the triggering event may comprise detecting that the number of incremental files within the first snapshot chain is greater than 100 incremental files due to the acquisition of an additional incremental file corresponding with the most recent snapshot of a virtual machine.

In step 510, a second base image associated with a second snapshot chain is generated using the first base image and the first set of incremental files. In one example, the second base image may be generated by patching the first set of incremental files to the first base image or patching a subset of the first set of incremental files (e.g., the forward incrementals) to the first base image. In step 512, a second set of incremental files that derives from the second base image is acquired. In step 514, the second base image and the second set of incremental files are stored. In one embodiment, the second base image may be stored using a first storage device of a first type (e.g., using a HDD) and the second set of incremental files may be stored using a second storage device of a second type (e.g., using a SSD). In some cases, the first base image associated with the first snapshot chain and the second base image associated with the second snapshot chain may both be stored using a first storage device (e.g., a first HDD or a first SSD) and the first set of incremental files associated with the first snapshot chain and the second set of incremental files associated with the second snapshot chain may be stored using a second storage device (e.g., a second SSD).

In step 516, a first operation is performed on the first snapshot chain while a second operation is performed on the second snapshot chain. The first operation and the second operation may be performed concurrently or in parallel. The second operation may generate a third base image associated with the second snapshot chain. In one example, the third base image may be generated during a rebasing operation. In step 518, the third base image is stored (e.g., using the same storage device as that used for previously storing the second base image).

Figure 5B:
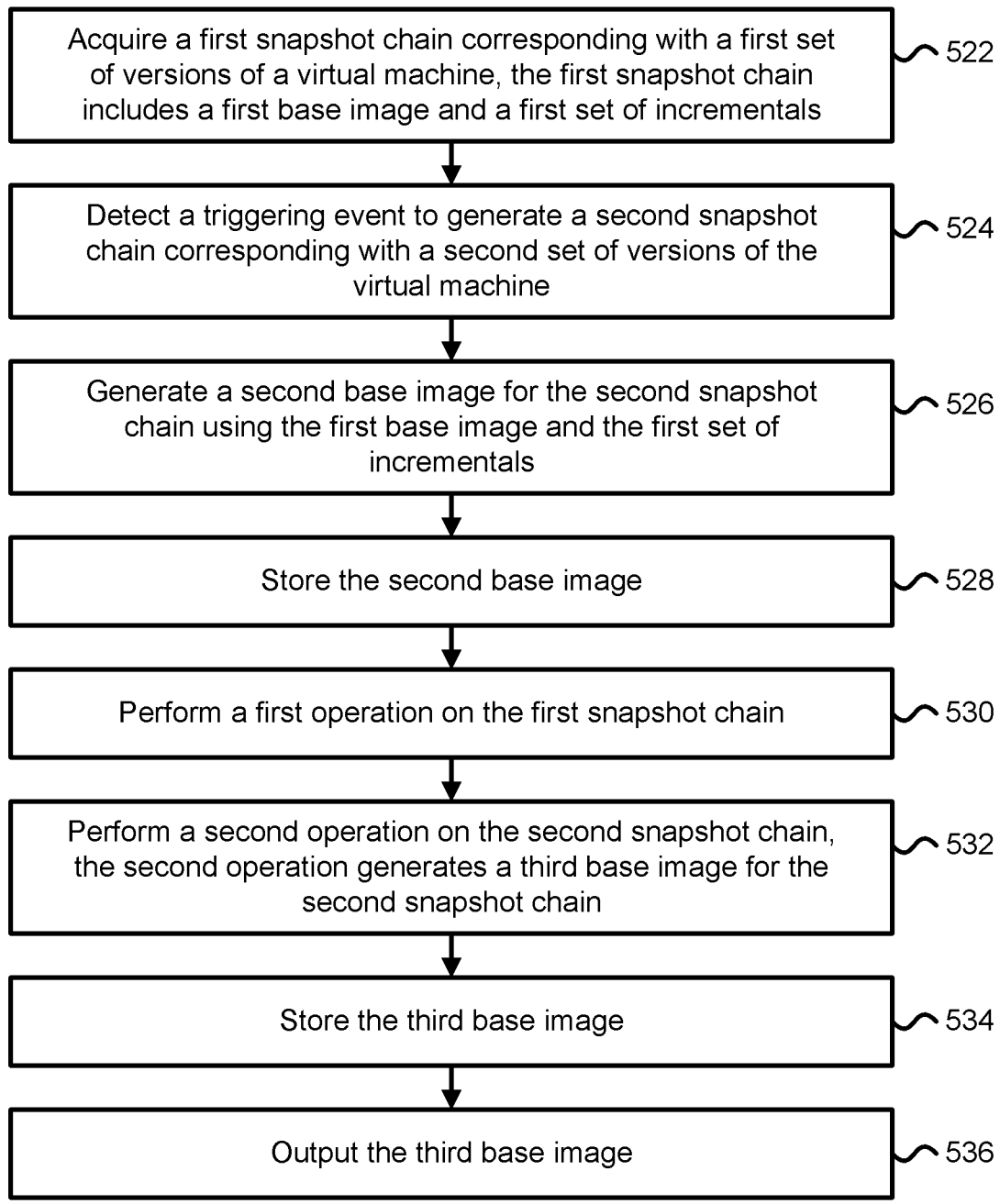
FIG. 5B is a flowchart describing another embodiment of a process for generating a new snapshot chain.

FIG. 5B is a flowchart describing another embodiment of a process for generating a new snapshot chain. In one embodiment, the process of FIG. 5B may be performed by a storage appliance, such as storage appliance 170 or storage appliance 140 in FIG. 1A.

In step 522, a first snapshot chain corresponding with a first set of versions of a virtual machine is acquired. The first snapshot chain may include a first base image and a first set of incrementals (or incremental files). In one example, the first set of incrementals may comprise a set of forward incremental files. In another example, the first set of incrementals may include a foreword incremental file and a reverse incremental file that both derive from the first base image. In step 524, a triggering event to generate a second snapshot chain corresponding with a second set of versions of the virtual machine is detected. The first set of versions may correspond with versions of the virtual machine captured prior to the second set of versions of the virtual machine. In one example, the triggering event may comprise detecting that the number of incremental files within the first snapshot chain has exceeded a maximum threshold of incremental files (e.g., has exceeded 200 forward incremental files). In another example, the triggering event may comprise detecting that a snapshot frequency at which snapshots of the virtual machine are captured and stored has changed from a first snapshot frequency (e.g., capturing snapshots every 4 hours) to a second snapshot frequency (e.g., capturing snapshots every hour) different from the first snapshot frequency. The triggering event may comprise detecting an increase in the rate at which snapshots of the virtual machine are captured and stored.

In step 526, a second base image for the second snapshot chain is generated using the first base image and the first set of incrementals. In step 528, the second base image is stored. In step 530, a first operation is performed on the first snapshot chain. In step 532, a second operation is performed on the second snapshot chain. In one embodiment, the first operation may be performed on the first snapshot chain while the second operation is performed on the second snapshot chain. The first operation and the second operation may be performed concurrently. In one example, the first operation may comprise a rebasing operation and the second operation may comprise a consolidation operation. In another example, the first operation may comprise a first consolidation operation and the second operation may comprise a second consolidation operation. In another example, the first operation may comprise a read operation for reading the first base image and the second operation may comprise a read operation for reading the second base image. In another embodiment, the first operation may be performed on the first snapshot chain while no operations are performed on the second snapshot chain.

In step 534, the third base image is stored. In one example, the third base image may be stored using a solid-state drive.

In step 536, the third base image may be outputted. The third base image may be transmitted to a computing device, such as server 160 or storage appliance 140 in FIG. 1A.

Figure 5C:
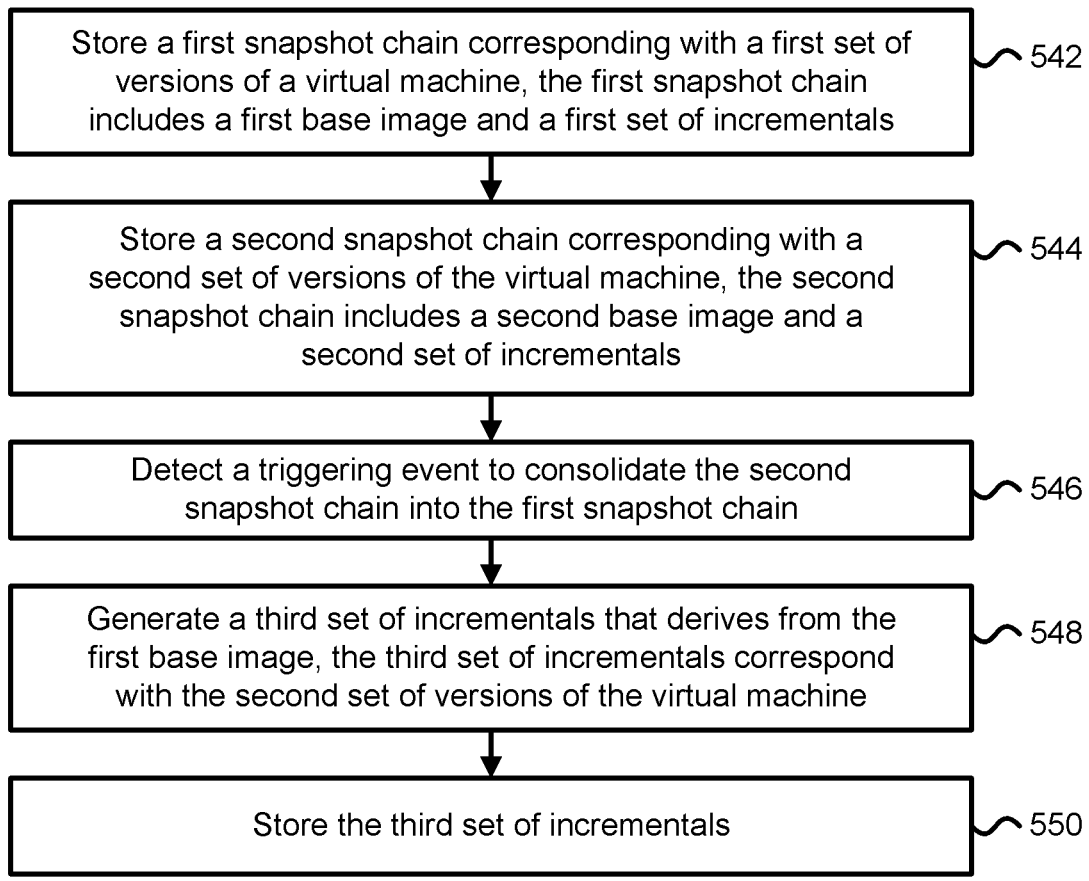
FIG. 5C is a flowchart describing one embodiment of a process for consolidating two or more snapshot chains into a single snapshot chain.

FIG. 5C is a flowchart describing one embodiment of a process for consolidating two or more snapshot chains into a single snapshot chain. In one embodiment, the process of FIG. 5C may be performed by a storage appliance, such as storage appliance 170 or storage appliance 140 in FIG. 1A.

In step 542, a first snapshot chain corresponding with a first set of versions of a virtual machine is stored. The first snapshot chain may include a first base image and a first set of incrementals (e.g., a first set of incremental files). In step 544, a second snapshot chain corresponding with a second set of versions of the virtual machine is stored. The second snapshot chain may include a second base image and a second set of incrementals. In one example, the first snapshot chain may correspond with the first snapshot chain depicted in FIG. 2P and the second snapshot chain may correspond with the second snapshot chain depicted in FIG. 2P. In step 546, a triggering event to consolidate the second snapshot chain and the first snapshot chain is detected. In one embodiment, the triggering event may comprise detecting that the total number of incremental files within the first snapshot chain and the second snapshot chain is less than a threshold number of incremental file (e.g., is less than 200 incremental files combined). In another embodiment, the triggering event may comprise detecting that the amount of available disk space for a cluster is less than a threshold amount of disk space (e.g., that the amount of available disk space is less than 20 TB). In step 548, a third set of incrementals that derives from the first base image is generated. The third set of incrementals may correspond with the second set of versions of the virtual machine. In step 550, the third set of incrementals is stored. In this case, the first set of versions of the virtual machine and the second set of versions of the virtual machine that were stored using two different snapshot chains and two different base images (e.g., the first base image and the second base image) may be stored using a consolidated snapshot chain with a single base image (e.g., the third base image).

Figure 6A:
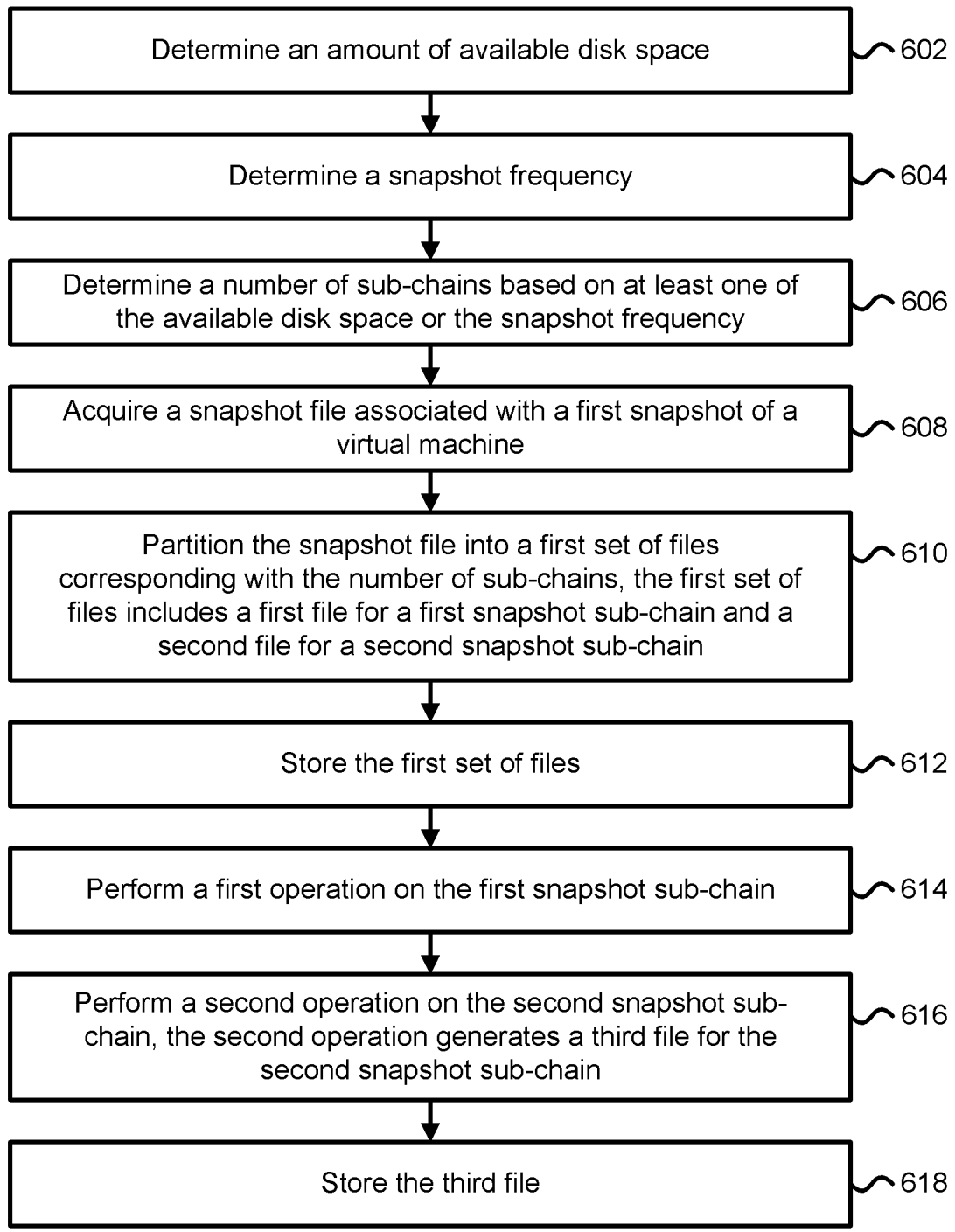
FIG. 6A is a flowchart describing one embodiment of a process for generating two or more snapshot sub-chains from a single snapshot chain.

FIG. 6A is a flowchart describing one embodiment of a process for generating two or more snapshot sub-chains from a single snapshot chain. In one embodiment, the process of FIG. 6A may be performed by a storage appliance, such as storage appliance 170 or storage appliance 140 in FIG. 1A.

In step 602, an amount of available disk space is determined. In one example, the available disk space may correspond with the amount of available disk space for storing files using a storage appliance, such as storage appliance 140 in FIG. 1A, or using a cluster of data storage nodes. In step 604, a snapshot frequency is determined. The snapshot frequency may correspond with a rate at which point in time versions of a virtual machine or an electronic file are captured and stored. In step 606, a number of sub-chains is determined based on at least one of the amount of available disk space or the snapshot frequency. In one example, if the amount of available disk space is less than 20 TB, then number of sub-chains may be set to four sub-chains. If the amount of available disk space is less than 10 TB, then number of sub-chains may be set to eight sub-chains.

In step 608, a snapshot file (e.g., corresponding with a full image snapshot or an incremental snapshot of a virtual machine) associated with a first snapshot of a virtual machine is acquired. In step 610, the snapshot file is partitioned or split into a first set of files corresponding with the number of sub-chains. The first set of files includes a first file for a first snapshot sub-chain and a second file for a second snapshot sub-chain. In step 612, the first set of files is stored. In step 614, a first operation is performed on the first snapshot sub-chain. In step 616, a second operation is performed on the second snapshot sub-chain. In some cases, the first operation and the second operation may be performed concurrently or at the same time. The first operation may comprise a reverse, rebasing, or consolidation operation. In one example, the first operation may comprise a first consolidation operation and the second operation may comprise a second consolidation operation. In another example, the first operation may comprise a first consolidation operation and the second operation may comprise a second rebasing operation. The second operation may generate a third file for the second snapshot sub-chain. In one example, the third file may comprise a new base image for the second snapshot sub-chain and the second operation may comprise a rebasing operation. In step 618, the third file is stored.

Figure 6B:
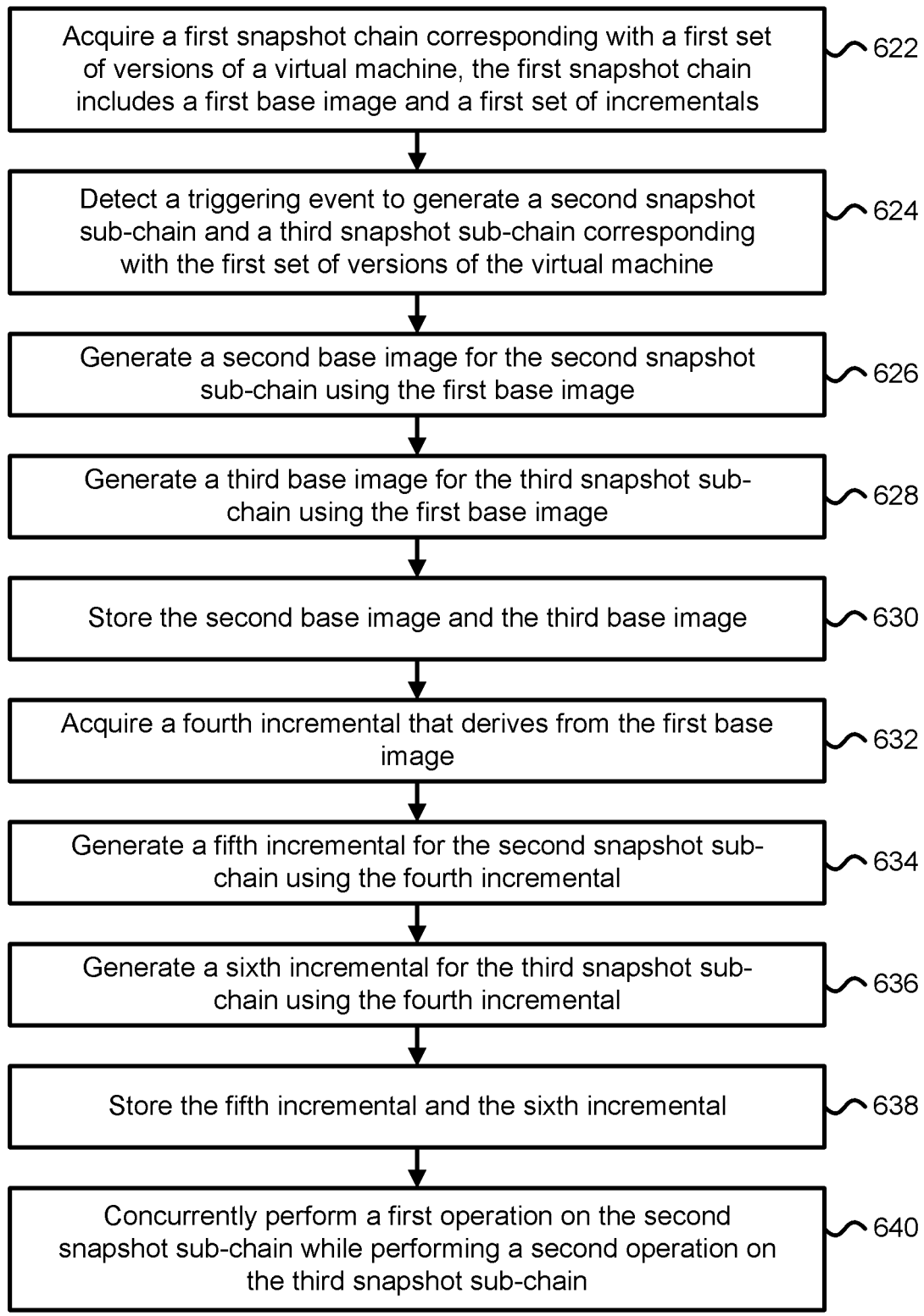
FIG. 6B is a flowchart describing another embodiment of a process for generating two or more snapshot sub-chains from a single snapshot chain.

FIG. 6B is a flowchart describing another embodiment of a process for generating two or more snapshot sub-chains from a single snapshot chain. In one embodiment, the process of FIG. 6B may be performed by a storage appliance, such as storage appliance 170 or storage appliance 140 in FIG. 1A.

In step 622, a first snapshot chain corresponding with a first set of versions of a virtual machine is acquired. In one example, the first set of versions may correspond with versions V1-V7 of Virtual Machine A in FIG. 2A. The first snapshot chain may include a first base image and a first set of incremental files. In step 624, a triggering event to generate a second snapshot sub-chain and a third snapshot sub-chain corresponding with the first set of versions of the virtual machine is detected. In one example, the triggering event may comprise detection that the amount of available disk space has fallen below a threshold amount of disk space (e.g., the amount of available disk space is less than 5 TB). In another example, the triggering event may comprise detection that a snapshot frequency for capturing snapshots of the virtual machine has risen above a threshold snapshot frequency (e.g., the snapshot frequency has been adjusted to capture snapshots of the virtual machine from every 24 hours to every four hours).

In one embodiment, the first snapshot chain may correspond with snapshot chain 412 in FIG. 4B, the second snapshot sub-chain may correspond with snapshot sub-chain 414 in FIG. 4B, and the third snapshot sub-chain may correspond with snapshot sub-chain 416 in FIG. 4B.

In step 626, a second base image for the second snapshot sub-chain is generated using the first base image. In step 628, a third base image for the third snapshot sub-chain is generated using the first base image. In one example, the first base image may comprise a file of size 1 TB, the second base image may comprise the first half of the file comprising a second file of size 500 GB, and the third base image may comprise the second half of the file comprising a third file of size 500 GB. In another example, the first base image may comprise a file of size 1 TB, the second base image may comprise a second file of size 800 GB, and the third base image may comprise a third file of size 200 GB. In step 630, the second base image and the third base image are stored. In one example, the second base image may be stored using a first storage device (e.g., a first SSD) and the third base image may be stored using the first storage device. In another example, the second base image may be stored using a first storage device (e.g., a first SSD) and the third base image may be stored using a second storage device (e.g., a second SSD).

In step 632, a fourth incremental file that derives from the first base image is acquired. In step 634, a fifth incremental file for the second snapshot sub-chain is generated using the fourth incremental file. In step 636, a sixth incremental file for the third snapshot sub-chain is generated using the fourth incremental file. In some cases, the incremental files for the individual snapshot sub-chains may be generated by acquiring an input incremental file encompassing data changes made to a single base image (e.g., acquired from server 160 in FIG. 1A), partitioning the input incremental file into a set of incremental files associated with the widths of the sub-chains, and determining the data changes between each file in the set of incremental files and a corresponding sub-chain level base image.

In step 638, the fifth incremental file and the sixth incremental file are stored. In one example, the fifth incremental file may be stored using a first storage device (e.g., a first SSD) and the sixth incremental file may be stored using the first storage device. In another example, the fifth incremental file may be stored using a first storage device (e.g., a first SSD) and the sixth incremental file may be stored using a second storage device (e.g., a second SSD). In step 640, a first operation is performed on the second snapshot sub-chain while performing a second operation on the third snapshot sub-chain. The first operation may be performed in parallel with the second operation or overlapping in time with the second operation. In one example, the first operation may comprise a rebasing operation and the second operation may comprise a consolidation operation. In another example, the first operation and the second operation may both comprise consolidation operations.

Figure 6C:
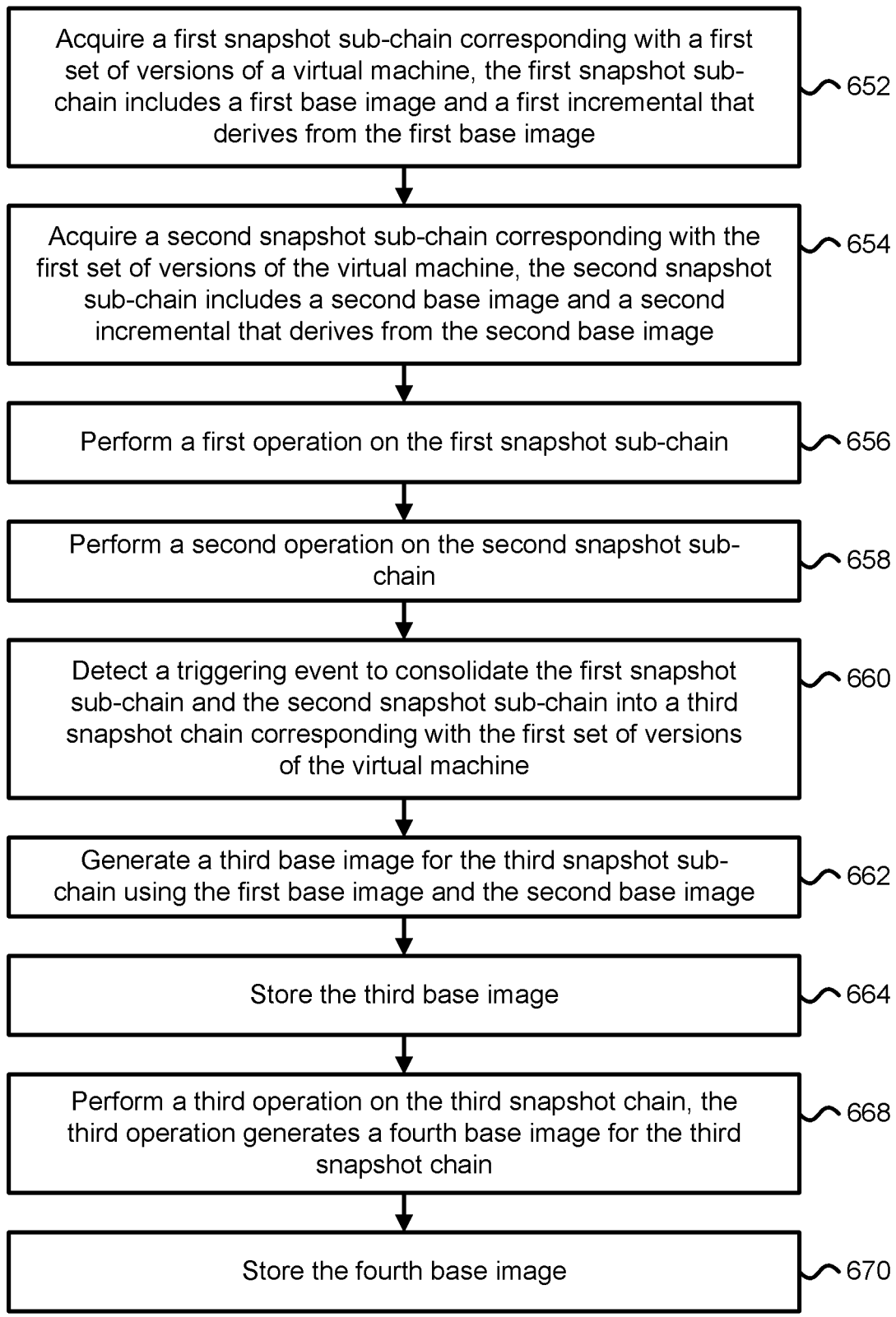
FIG. 6C is a flowchart describing one embodiment of a process for consolidating two or more snapshot sub-chains into a single snapshot chain.

FIG. 6C is a flowchart describing one embodiment of a process for consolidating two or more snapshot sub-chains into a single snapshot chain. In one embodiment, the process of FIG. 6C may be performed by a storage appliance, such as storage appliance 170 or storage appliance 140 in FIG. 1A.

In step 652, a first snapshot sub-chain corresponding with a first set of versions of a virtual machine is acquired. The first snapshot sub-chain may include a first base image and a first incremental file that derives from the first base image. In step 654, a second snapshot sub-chain corresponding with the first set of versions of the virtual machine is acquired. The second snapshot sub-chain may include a second base image and a second incremental file that derives from the second base image. In step 656, a first operation is performed on the first snapshot sub-chain. In step 658, a second operation is performed on the second snapshot sub-chain. The first operation and the second operation may be performed concurrently or in parallel. The first operation may comprise one of a reverse, rebasing, or a consolidation operation.

In step 660, a triggering event to consolidate the first snapshot sub-chain and the second snapshot sub-chain into a third snapshot chain corresponding with the first set of versions of the virtual machine is detected. In one embodiment, the triggering event may comprise detecting that an amount of available disk space is greater than a threshold amount of disk space (e.g., it is detected that the amount of available disk space is greater than 20 TB). In another embodiment, the triggering event may comprise detecting that a snapshot frequency has been adjusted to be less than a threshold snapshot frequency (e.g., the snapshot frequency has been reduced such that snapshots are captured every 24 hours instead of every four hours).

In one embodiment, the first snapshot sub-chain may correspond with snapshot sub-chain 414 in FIG. 4E, the second snapshot sub-chain may correspond with snapshot sub-chain 416 in FIG. 4E, and the third snapshot chain may correspond with snapshot chain 422 in FIG. 4E.

In step 662, a third base image for the third snapshot sub-chain is generated using the first base image and the second base image. In some cases, if the first base image and the second base image are aligned such that both the first base image and the second base image correspond with the same version of a virtual machine, then the third base image may comprise a concatenation of the first base image and the second base image. In step 664, the third base image is stored. In step 668, a third operation is performed on the third snapshot chain. The third operation may generate a fourth base image for the third snapshot chain. In this case, the third operation may comprise a rebasing operation. In step 670, the fourth base image is stored.

Figure 6D:
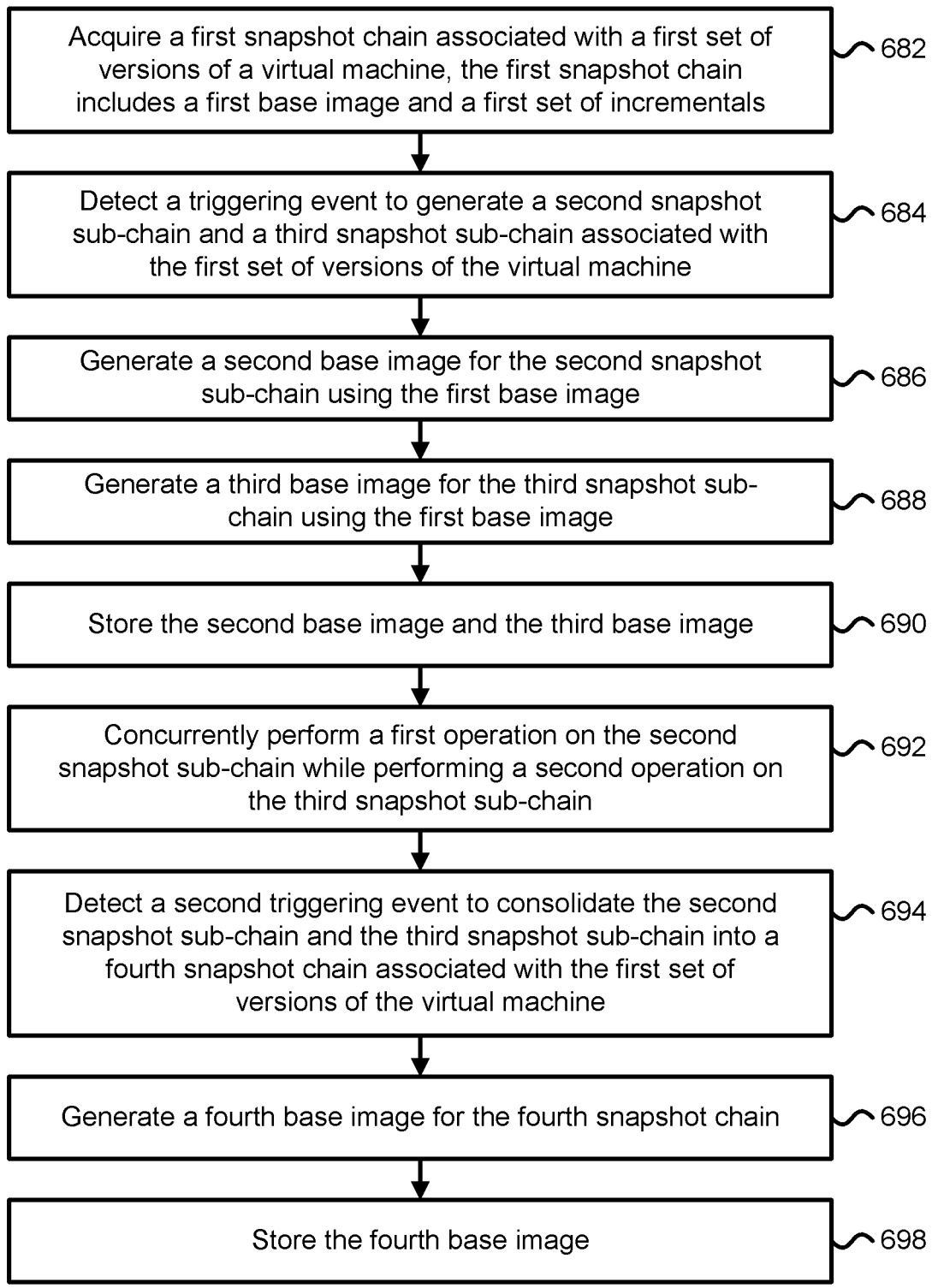
FIG. 6D is a flowchart describing one embodiment of a process for dynamically increasing and decreasing the number of snapshot sub-chains used for storing different point in time versions of a virtual machine.

FIG. 6D is a flowchart describing one embodiment of a process for dynamically increasing and decreasing the number of snapshot sub-chains used for storing different point in time versions of a virtual machine. In one embodiment, the process of FIG. 6D may be performed by a storage appliance, such as storage appliance 170 or storage appliance 140 in FIG. 1A.

In step 682, a first snapshot chain associated with a first set of versions of a virtual machine is acquired. The first snapshot chain includes a first base image and a first set of incremental files. In step 684, a triggering event to generate a second snapshot sub-chain and a third snapshot sub-chain associated with the first set of versions of the virtual machine is detected. In one embodiment, the triggering event may comprise detection that an available amount of disk space for storing additional snapshots of the virtual machine is less than a threshold amount of disk space. In step 686, a second base image for the second snapshot sub-chain is generated using the first base image. In step 688, a third base image for the third snapshot sub-chain is generated using the first base image. In step 690, the second base image and the third base image are stored. In step 692, a first operation is performed on the second snapshot sub-chain while performing a second operation on the third snapshot sub-chain. The first operation and the second operation may be performed concurrently. The first operation may comprise a consolidation operation and the second operation may comprise a reverse operation. In step 694, a second triggering event to consolidate the second snapshot sub-chain and the third snapshot sub-chain into a fourth snapshot chain associated with the first set of versions of the virtual machine is detected. In one embodiment, the second triggering event may comprise detection that an available amount of disk space for storing additional snapshots of the virtual machine is greater than a threshold amount of disk space. In step 696, a fourth base image for the fourth snapshot chain is generated. In step 698, the fourth base image is stored.

One embodiment of the disclosed technology includes acquiring a snapshot chain corresponding with a first set of versions of a virtual machine (e.g., versions V1-V100). The snapshot chain includes a base image and a set of incremental files. The method further comprises detecting a triggering event to generate a first snapshot sub-chain and a second snapshot sub-chain corresponding with the first set of versions of the virtual machine, generating a first base image for the first snapshot sub-chain using the base image in response to detecting the triggering event, generating a second base image for the second snapshot sub-chain using the base image in response to detecting the triggering event, and performing a first operation on the first snapshot sub-chain while performing a second operation different from the first operation on the second snapshot sub-chain. The performing the first operation includes reading the first base image. The performing the second operation includes reading the second base image.

One embodiment of the disclosed technology includes acquiring a first snapshot chain corresponding with a first set of versions of a virtual machine (e.g., versions V1-V100). The first snapshot chain includes a first base image and a first set of incremental files. The method further comprises detecting a triggering event to generate a second snapshot chain corresponding with a second set of versions of the virtual machine (e.g., versions V101-V200), generating a second base image for the second snapshot chain using the first base image and the first set of incremental files, storing the second base image, and performing a first operation on the first snapshot chain while performing a second operation different from the first operation on the second snapshot chain. The performing the first operation includes reading the first base image. The performing the second operation includes reading the second base image.

One embodiment of the disclosed technology includes a memory (e.g., a volatile or non-volatile memory) in communication with one or more processors. The memory configured to store a snapshot chain corresponding with a first set of versions of a virtual machine. The snapshot chain includes a base image and a set of incremental files. The one or more processors configured to detect a triggering event to generate a first snapshot sub-chain and a second snapshot sub-chain corresponding with the first set of versions of the virtual machine. The one or more processors configured to generate a first base image for the first snapshot sub-chain using the base image and generate a second base image for the second snapshot sub-chain using the base image in response to detection of the triggering event. The one or more processors configured to cause a first operation to be performed on the first snapshot sub-chain while a second operation different from the first operation is performed on the second snapshot sub-chain. The first operation includes reading the first base image. The second operation includes reading the second base image.

One embodiment of the disclosed technology includes a memory (e.g., a volatile or non-volatile memory) in communication with one or more processors. The memory configured to store a first snapshot chain corresponding with a first set of versions of a virtual machine. The first snapshot chain includes a first base image and a first set of incremental files. The one or more processors configured to detect a triggering event to generate a second snapshot chain corresponding with a second set of versions of the virtual machine and generate a second base image for the second snapshot chain using the first base image and the first set of incremental files. The one or more processors configured to cause a first operation to be performed on the first snapshot chain while a second operation different from the first operation is performed on the second snapshot chain. The first operation includes reading the first base image and the second operation includes reading the second base image.

One embodiment of the disclosed technology comprises one or more non-transitory storage devices containing processor readable code for programming one or more processors to perform a method for operating a data management system. The processor readable code comprising processor readable code configured to acquire a snapshot chain corresponding with a first set of versions of a virtual machine. The snapshot chain includes a base image and a set of incremental files. The processor readable code configured to determine an amount of available disk space for a cluster of data storage nodes, detect a triggering event to generate a first snapshot sub-chain and a second snapshot sub-chain corresponding with the first set of versions of the virtual machine based on the amount of available disk space for the cluster of data storage nodes, generate a first base image for the first snapshot sub-chain using the base image in response to detection of the triggering event, generate a second base image for the second snapshot sub-chain using the base image in response to detection of the triggering event, and concurrently perform a first operation on the first snapshot sub-chain while a second operation different from the first operation is performed on the second snapshot sub-chain. The first operation includes reading the first base image and the second operation includes reading the second base image.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
    acquiring a snapshot chain corresponding with a first set of versions of a virtual machine, the snapshot chain including a first set of files, the first set of files including a base image and a set of incremental files;
    upon detecting a triggering event including determining an amount of available disk space and detecting that the amount of available disk space is less than a threshold amount of disk space, splitting the first set of files of the snapshot chain into a first snapshot sub-chain and a second snapshot sub-chain, the first snapshot sub-chain including a second set of files corresponding with the first snapshot sub-chain, the second snapshot sub-chain including a third, separate set of files corresponding with the second snapshot sub-chain, the first snapshot sub-chain and the second snapshot sub-chain including a uniform width or maximum file size;
    generating a first base image for the first snapshot sub-chain using the base image of the snapshot chain in response to detecting the triggering event, the first base image corresponding to a first version of the virtual machine;
    generating a second base image for the second snapshot sub-chain using the base image of the snapshot chain in response to detecting the triggering event, the second base image corresponding to a second version different from the first version of the virtual machine; and
    performing a first operation on the first snapshot sub-chain while independently performing a second operation on the second snapshot sub-chain, the performing of the first operation including a consolidation operation, the performing of the second operation including a rebasing operation.

2. The method of claim 1, wherein:
    the detecting the triggering event includes determining a snapshot frequency for the virtual machine and detecting that the snapshot frequency is greater than a threshold snapshot frequency.

3. The method of claim 1, further comprising:
    storing the first base image on a first storage device; and
    storing the second base image on a second storage device different from the first storage device.

4. The method of claim 1, further comprising:
    determining an amount of available disk space;
    determining a threshold number of snapshot sub-chains based on the amount of available disk space; and
    generating a set of base images each corresponding with the number of snapshot sub-chains, the set of base images includes the first base image and the second base image.

5. The method of claim 1, wherein:
    the first base image has a first file size and the base image has a second file size that is greater than the first file size;
    the first snapshot sub-chain has a first maximum file size; and
    the second snapshot sub-chain has a second maximum file size different from the first maximum file size.

6. The method of claim 1, further comprising:
    detecting a second triggering event to consolidate the first snapshot sub-chain and the second snapshot sub-chain into a third snapshot chain corresponding with the first set of versions of the virtual machine.

7. The method of claim 6, wherein:
the detecting the second triggering event includes detecting that an amount of available disk space is greater than a threshold amount of disk space.

8. The method of claim 6, wherein:
the detecting the second triggering event includes detecting that a snapshot frequency for the virtual machine is less than a threshold snapshot frequency.

9. A data management system, comprising:
a memory configured to store a snapshot chain corresponding with a first set of versions of a virtual machine, the snapshot chain including a first set of files, the first set of files including a base image and a set of incremental files; and
one or more processors configured to determine an amount of available disk space and detect a triggering event if the amount of available disk space is less than a threshold amount of disk space and to split the first set of files of the snapshot chain into a first snapshot sub-chain and a second snapshot sub-chain upon detecting the triggering event, the first snapshot sub-chain including a second set of files corresponding with the first snapshot sub-chain, the second snapshot sub-chain including a third, separate set of files corresponding with the second snapshot sub-chain, the first snapshot sub-chain and the second snapshot sub-chain including a uniform width or maximum file size,
the one or more processors configured to generate a first base image for the first snapshot sub-chain using the base image of the snapshot chain, the first base image corresponding to a first version of the virtual machine, and generate a second base image for the second snapshot sub-chain using the base image of the snapshot chain in response to detection of the triggering event, the second base image corresponding to a second version different from the first version of the virtual machine,
the one or more processors configured to cause a first operation to be performed on the first snapshot sub-chain while a second operation is performed independently on the second snapshot sub-chain, the first operation including a consolidation operation, the performing of the second operation including a rebasing operation.

10. The data management system of claim 9, wherein:
the one or more processors configured to determine a snapshot frequency for the virtual machine and detect the triggering event if the snapshot frequency is greater than a threshold snapshot frequency.

11. The data management system of claim 9, wherein:
the first base image is stored using a first storage device; and
the second base image is stored using a second storage device different from the first storage device.

12. The data management system of claim 9, wherein:
the one or more processors configured to determine a threshold number of snapshot sub-chains based on an amount of available disk space and generate a set of base images each corresponding with the number of snapshot sub-chains, the set of base images includes the first base image and the second base image.

13. The data management system of claim 9, wherein:
the first snapshot sub-chain has a first maximum file size; and
the second snapshot sub-chain has a second maximum file size greater than the first maximum file size.

14. The data management system of claim 9, wherein:
the one or more processors configured to detect a second triggering event to consolidate the first snapshot sub-chain and the second snapshot sub-chain into a third snapshot chain corresponding with the first set of versions of the virtual machine, the one or more processors configured to generate a third base image for the third snapshot chain in response to detection of the second triggering event.

15. The data management system of claim 14, wherein:
the second triggering event comprises detection that an amount of available disk space is greater than a threshold amount of disk space.

16. One or more storage devices containing processor readable code for programming one or more processors to perform a method for operating a data management system, the processor readable code comprising:
processor readable code configured to acquire a snapshot chain corresponding with a first set of versions of a virtual machine, the snapshot chain including a first set of files, the first set of files including a base image and a set of incremental files;
processor readable code configured to determine an amount of available disk space for a cluster of data storage nodes;
processor readable code configured to determine an amount of available disk space and detect a triggering event if the amount of available disk space is less than a threshold amount of disk space and to detect the triggering event to split the first set of files of the snapshot chain into a first snapshot sub-chain and a second snapshot sub-chain, the first snapshot sub-chain including a second set of files corresponding with the first snapshot sub-chain, the second snapshot sub-chain including a third, separate set of files corresponding with the second snapshot sub-chain, the first snapshot sub-chain and the second snapshot sub-chain including a uniform width or maximum file size;
processor readable code configured to generate a first base image for the first snapshot sub-chain using the base image in response to a detection of the triggering event, the first base image corresponding to a first version of the virtual machine;
processor readable code configured to generate a second base image for the second snapshot sub-chain using the base image in response to a detection of the triggering event, the second base image corresponding to a version different from the first version of the virtual machine;
processor readable code configured to perform a first operation on the first snapshot sub-chain while independently performing a second operation on the second snapshot sub-chain, the first operation including a consolidation operation, the performing of the second operation including a rebasing operation.

* * * * *